(12) United States Patent
Okuzawa et al.

(10) Patent No.: US 11,332,614 B2
(45) Date of Patent: May 17, 2022

(54) REINFORCED POLYCARBONATE RESIN COMPOSITION

(71) Applicants: TEIJIN LIMITED, Osaka (JP); Daikin Industries, Ltd., Osaka (JP)

(72) Inventors: Shunsuke Okuzawa, Osaka (JP); Toshiyuki Miyake, Osaka (JP); Koji Nakanishi, Osaka (JP); Masaji Komori, Osaka (JP); Hideki Kono, Osaka (JP)

(73) Assignees: TEIJIN LIMITED, Osaka (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/626,407

(22) PCT Filed: Jun. 25, 2018

(86) PCT No.: PCT/JP2018/024011
§ 371 (c)(1),
(2) Date: Dec. 24, 2019

(87) PCT Pub. No.: WO2019/004127
PCT Pub. Date: Jan. 3, 2019

(65) Prior Publication Data
US 2020/0140682 A1  May 7, 2020

(30) Foreign Application Priority Data

Jun. 28, 2017 (JP) ............... JP2017-126244
Jun. 28, 2017 (JP) ............... JP2017-126245

(51) Int. Cl.
| C08L 69/00 | (2006.01) |
| C08L 27/18 | (2006.01) |
| C08K 7/14 | (2006.01) |
| C08K 7/06 | (2006.01) |
| C08J 5/04 | (2006.01) |
| C08L 23/08 | (2006.01) |

(52) U.S. Cl.
CPC .............. *C08L 69/00* (2013.01); *C08J 5/042* (2013.01); *C08J 5/043* (2013.01); *C08K 7/06* (2013.01); *C08K 7/14* (2013.01); *C08L 23/08* (2013.01); *C08L 27/18* (2013.01); *C08L 2201/02* (2013.01); *C08L 2201/08* (2013.01); *C08L 2203/20* (2013.01); *C08L 2205/03* (2013.01)

(58) Field of Classification Search
None
See application file for complete search history.

(56) References Cited

U.S. PATENT DOCUMENTS

| 4,224,215 A | 9/1980 | Macke |
| 4,749,752 A * | 6/1988 | Youlu ............ C08L 27/18 524/406 |
| 4,753,994 A | 6/1988 | Carter, Jr. et al. |
| 4,767,821 A | 8/1988 | Lindner et al. |
| 5,087,680 A | 2/1992 | Duan et al. |
| 5,389,725 A | 2/1995 | Bando |
| 5,516,920 A | 5/1996 | Nesvadba et al. |
| 5,521,230 A | 5/1996 | Bhatia et al. |
| 5,684,088 A | 11/1997 | Miyamori et al. |
| 5,804,654 A | 9/1998 | Lo et al. |
| 6,025,441 A | 2/2000 | Koshirai et al. |
| 2008/0032080 A1 * | 2/2008 | Faulkner ............ F16J 15/102 428/36.91 |
| 2009/0209696 A1 * | 8/2009 | Lee ............ C08L 67/02 524/494 |

FOREIGN PATENT DOCUMENTS

| CN | 105802181 | 7/2016 |
| EP | 0 483 510 | 5/1992 |
| JP | 49-124150 | 11/1974 |
| JP | 50-44241 | 4/1975 |
| JP | 55-160052 | 12/1980 |
| JP | 56029704 B * | 7/1981 |
| JP | 60-258263 | 12/1985 |
| JP | 61-2750 | 1/1986 |
| JP | 63-154744 | 6/1988 |
| JP | 63-213555 | 9/1988 |
| JP | 3-273052 | 12/1991 |
| JP | 4-272957 | 9/1992 |
| JP | 5-171025 | 7/1993 |
| JP | 6-145520 | 5/1994 |

(Continued)

OTHER PUBLICATIONS

International Search Report dated Jul. 31, 2018 in International (PCT) Application No. PCT/JP2018/024011.

*Primary Examiner* — David J Buttner

(74) *Attorney, Agent, or Firm* — Wenderoth, Lind & Ponack, L.L.P.

(57) ABSTRACT

The present invention provides a reinforced polycarbonate resin composition having all of excellent strength, impact resistance, heat resistance, flame retardancy and thermal stability. A reinforced polycarbonate resin composition which contains 100 parts by weight of a resin composition composed of (A) 50 to 95 parts by weight of a polycarbonate resin (component A) and (B) 5 to 50 parts by weight of a fibrous filler (component B) and (C) 2 to 45 parts by weight of a fluororesin (component C-I) or 2 to 45 parts by weight of a fluororesin (component C-II), wherein (I) the fluororesin (component C-I) is a copolymer containing polymerization units respectively represented by general formulae [1] and [2] and has a melting point of 200 to 280° C., and (II) the fluororesin (component C-II) is a copolymer containing polymerization units respectively represented by general formulae [1] and [2], has a melting point of 240 to 300° C., and has a 5% weight loss temperature of 470° C. or higher as measured by TGA (thermal gravimetric analysis).

6 Claims, No Drawings

(56) References Cited

FOREIGN PATENT DOCUMENTS

| | | |
|---|---:|---:|
| JP | 6-220210 | 8/1994 |
| JP | 7-233160 | 9/1995 |
| JP | 8-188653 | 7/1996 |
| JP | 9-95583 | 4/1997 |
| JP | 9-302209 | 11/1997 |
| JP | 11-29679 | 2/1999 |
| JP | 2015-48409 | 3/2015 |
| JP | 2015-168771 | 9/2015 |
| JP | 2015199892 | * 11/2015 |
| KR | 10-2010-0077939 | 7/2010 |
| KR | 10-2014-0137536 | 12/2014 |
| WO | 93/21272 | 10/1993 |

* cited by examiner

REINFORCED POLYCARBONATE RESIN COMPOSITION

FIELD

The present invention relates to a reinforced polycarbonate resin composition. More particularly, the present invention relates to a reinforced polycarbonate resin composition that demonstrates favorable impact resistance, heat resistance, flame retardation and heat stability while having superior strength, and can be preferably used in various fields such as electricity and electronics, automobiles, infrastructure and communications.

BACKGROUND

Polycarbonate resin is used in numerous applications such as mechanical parts, automotive parts, electrical and electronic parts or office equipment parts due to the superior properties thereof such as mechanical strength, dimensional stability and flame retardation. In recent years, the need for such parts to demonstrate greater strength and heat resistance is growing accompanying the reduced size and higher performance levels of these parts. Reinforced polycarbonate resin is known in which at least one type of filler selected from the group consisting of fibrous fillers such as glass fiber or carbon fiber, sheet-like fillers such as talc and particulate fillers such as calcium carbonate is incorporated in polycarbonate resin for use as a material demonstrating improved strength and heat resistance.

However, polycarbonate resin has the shortcoming of suffering a considerable decrease in impact resistance as a result of adding glass fiber thereto. In the past, various methods have been examined that improve this decrease in impact resistance caused by the addition of glass fiber to polycarbonate resin.

In general, technology consisting of the incorporation of an elastomer as in, for example, PTL1 is generally known in order to improve impact resistance. However, although this results in improvement of impact resistance, there is the problem of decreased heat resistance and flame retardation.

PTL2 discloses a method for introducing a polycarbonate-polyorganosiloxane copolymer as a polycarbonate resin. However, in this case as well, although impact resistance improves, the problem of decreased heat resistance and flame retardation remains. In addition, even if impact resistance improved through the use of an alloy of polycarbonate resin and another resin such as a polyester-based resin or styrene-based resin, heat resistance and flame retardation end up decreasing, thus making this inadequate as a method for improving impact resistance while maintaining the strength and heat resistance of glass-reinforced resin compositions.

On the other hand, since fluororesins represented by polytetrafluoroethylene (PTFE) have unique properties such as non-stickiness or slipperiness in addition to demonstrating extremely superior heat resistance, chemical resistance and electrical properties in comparison with other polymer materials, they are widely used in applications ranging from automobiles, aircraft, semiconductors and telecommunications equipment to familiar household products. Known technologies for incorporating fluororesin in polycarbonate resin include the application thereof as an anti-drip agent (PTL3) and the application thereof as a sliding agent (PTL4). However, the application of fluororesins is limited to alloy materials due to the high melting point thereof.

PTL5 reports a resin composition obtained by incorporating a fluororesin having a melting point of 150° C. to 230° C. in a polycarbonate resin. However, there is no description relating to a fibrous filler or any mention of improved impact resistance of a reinforced resin composition. PTL6 reports on a thermoplastic resin composition obtained by incorporating base-treated, fluorine-containing elastomer in a thermoplastic resin. However, there is no description relating to polycarbonate and no mention of fibrous filler. PTL7 reports on a slidable polycarbonate resin composition containing a fluoropolymer not having the ability for form fibrils and carbon fiber in a polycarbonate resin. However, there is no description relating to improvement of impact resistance or heat resistance. PTL8 describes a resin composition containing polycarbonate, fibrous filler and fluororesin. It is described that polytetrafluoroethylene having a melting point of about 330° C. is preferable for use as the fluororesin.

CITATION LIST

Patent Literature

[PTL 1] Japanese Unexamined Patent Publication No. H03-273052

[PTL 2] Japanese Unexamined Patent Publication No. S55-160052

[PTL 3] Japanese Unexamined Patent Publication No. S50-44241

[PTL 4] Japanese Unexamined Patent Publication No. S63-213555

[PTL 5] Japanese Unexamined Patent Publication No. H05-171025

[PTL 6] International Publication No. WO 93/21272

[PTL 7] Japanese Unexamined Patent Publication No. 2015-48409

[PTL 8] Japanese Unexamined Patent Publication No. S61-2750

SUMMARY

Technical Problem

An object of the present invention is to provide a reinforced polycarbonate resin composition having favorable impact resistance, flame retardation, heat resistance and heat stability while retaining superior strength, and a molded article formed thereof.

Solution to Problem

As a result of conducting extensive research to achieve the aforementioned objects, the inventors of the present invention found that a reinforced polycarbonate resin composition is obtained that has superior strength, heat resistance, flame retardation, impact resistance and heat stability by incorporating a specific fluororesin in a component comprised of a polycarbonate resin and a fibrous filler, thereby leading to attainment of the present invention.

Namely, the present invention provides: (1) a reinforced polycarbonate resin composition containing, with respect to 100 parts by weight of a component comprised of (A) 50 parts by weight to 95 parts by weight of polycarbonate resin (Component A) and (B) 5 parts by weight to 50 parts by weight of fibrous filler (Component B), (C) 2 parts by weight to 45 parts by weight of a fluororesin (Component C-I) or 2 parts by weight to 45 parts by weight of a fluororesin (Component C-II); wherein, (I) the fluororesin (Component C-I) is a copolymer containing polymerization units represented by the following general formula (1) and (2), and the melting point of the fluororesin (Component C-I) is 200° C. to 280° C.:

[Chem. 1]

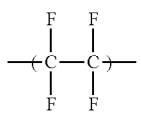

[1]

[Chem. 2]

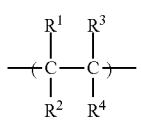

[2]

(in the aforementioned general formula (2), $R^1$, $R^2$, $R^3$ and $R^4$ respectively and independently represent a hydrogen atom or alkyl group having 1 to 5 carbon atoms), or (II) the fluororesin (Component C-II) is a copolymer containing polymerization units represented by the following general formulas (1) and (2), the melting point of the fluororesin (Component C-II) is 240° C. to 300° C., and the 5% weight loss temperature of the fluororesin (Component C-II) as determined by thermogravimetric analysis (TGA) is 470° C. or higher:

[Chem. 3]

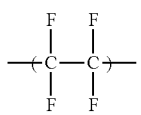

[1]

[Chem. 4]

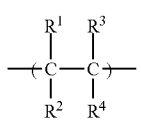

[2]

(in the aforementioned general formula (2), $R^1$, $R^2$, $R^3$ and $R^4$ respectively and independently represent a fluorine atom or fluoroalkyl group having 1 to 5 carbon atoms, provided that $R^1$, $R^2$, $R^3$ and $R^4$ are not all fluorine atoms).

A more preferable aspect of the present invention is (2) the reinforced polycarbonate resin composition described in the aforementioned Configuration (1), wherein $R^1$, $R^2$, $R^3$ and $R^4$ in the general formula (2) in the fluororesin (Component C-I) are hydrogen atoms.

A more preferable aspect of the present invention is (3) the reinforced polycarbonate resin composition described in the aforementioned Configuration (1), wherein the melting point of the fluororesin (Component C-I) is 231° C. to 280° C.

A more preferable aspect of the present invention is (4) the reinforced polycarbonate resin composition described in the aforementioned Configuration (1), wherein the Component B is glass fiber, carbon fiber or a mixture thereof.

A more preferable aspect of the present invention is (5) a molded article formed of the reinforced polycarbonate resin composition described in the aforementioned Configuration (1).

Advantageous Effects of Invention

The reinforced polycarbonate resin composition containing a fluororesin (Component C-I) of the present invention has superior strength, heat resistance, flame retardation and impact resistance. In addition, the reinforced polycarbonate resin composition containing a fluororesin (Component C-II) of the present invention has superior strength, heat resistance, flame retardation, impact resistance and heat stability.

The reinforced polycarbonate resin composition of the present invention is useful in various applications such as various electronic and electrical parts, camera parts, OA equipment parts, precision machinery parts, machinery parts, vehicle parts as well as agricultural materials, transport containers, playground equipment and miscellaneous goods, and the industrial effects demonstrated thereby are extraordinary.

DESCRIPTION OF EMBODIMENTS

The following provides a detailed explanation of the present invention.

<Component A: Polycarbonate Resin>

The polycarbonate resin used as component A of the present invention is normally obtained by reacting a dihydroxy compound with a carbonate precursor by interfacial polycondensation or melt transesterification, by polymerizing a carbonate prepolymer by solid-phase transesterification, or by ring-opening polymerizing a cyclic carbonate compound.

The dihydroxy compound as used herein may be a bisphenol or an aliphatic diol if it is normally used as a dihydroxy component for a polycarbonate.

Examples of bisphenols include 4,4'-dihydroxybiphenyl, bis(4-hydroxyphenyl)methane, 1,1-bis(4-hydroxyphenyl) ethane, 1,1-bis(4-hydroxyphenyl)-1-phenylethane, 2,2-bis (4-hydroxyphenyl)propane, 2,2-bis(4-hydroxy-3-methylphenyl)propane, 1,1-bis(4-hydroxyphenyl)-3,3,5-trimethylcyclohexane, 2,2-bis(4-hydroxy-3,3'-biphenyl) propane, 2,2-bis(4-hydroxy-3-isopropylphenyl)propane, 2,2-bis(3-t-butyl-4-hydroxyphenyl)propane, 2,2-bis(4-hydroxyphenyl)butane, 2,2-bis(4-hydroxyphenyl)octane, 2,2-bis(3-bromo-4-hydroxyphenyl) propane, 2,2-bis(3,5-dimethyl-4-hydroxyphenyl)propane, 2,2-bis(3-cyclohexyl-4-hydroxyphenyl)propane, 1,1-bis(3-cyclohexyl-4-hydroxyphenyl)cyclohexane, bis(4-hydroxyphenyl) diphenylmethane, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl) cyclopentane, 4,4'-dihydroxydiphenyl ether, 4,4'-dihydroxy-3,3'-dimethyldiphenyl ether, 4,4'-sulfonyldiphenol, 4,4'-dihydroxydiphenyl sulfoxide, 4,4'-dihydroxydiphenyl sulfide, 2,2'-dimethyl-4,4'-sulfonyldiphenol, 4,4'-dihydroxy-3,3'-dimethyldiphenyl sulfoxide, 4,4'-dihydroxy-3,3'-dimethyldiphenyl sulfide, 2,2'-diphenyl-4,4'-sulfonyl diphenol, 4,4'-dihydroxy-3,3'-diphenyldiphenyl sulfoxide, 4,4'-dihydroxy-3,3'-diphenyldiphenyl sulfide, 1,3-bis{2-(4-hydroxyphenyl) propyl}benzene, 1,4-bis{2-(4-hydroxyphenyl) propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.02,6]decane, 4,4'-(1,3-adamantanediyl)diphenol, 1,3-bis(4-hydroxyphenyl)-5,7-dimethyladamantane and bisphenol compounds having the siloxane structure represented by the following general formula (3):

[Chem. 5]

[3]

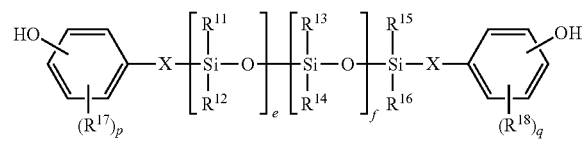

(in the aforementioned general formula (3), $R^{11}$, $R^{12}$, $R^{13}$, $R^{14}$, $R^{15}$ and $R^{16}$ respectively and independently represent a hydrogen atom, alkyl group having 1 to 12 carbon atoms, alkenyl group having 2 to 9 carbon atoms or optionally substituted aryl group having 6 to 12 carbon atoms, $R^{17}$ and $R^{18}$ respectively and independently represent a hydrogen atom, halogen atom, alkyl group having 1 to 10 carbon atoms, alkoxy group having 1 to 10 carbon atoms or optionally substituted aryl group having 6 to 12 carbon atoms, p and q respectively represent an integer of 1 to 4, e represents a natural number, f represents 0 or a natural number, e+f represents a natural number of 150 or less, and X represents an alkylene group having 2 to 8 carbon atoms).

Examples of aliphatic diols include 2,2-bis(4-hydroxycyclohexyl)-propane, 1,14-tetradecanediol, octaethylene glycol, 1,16-hexadecanediol, 4,4'-bis(2-hydroxyethoxy) biphenyl, bis {(2-hydroxyethoxy)phenyl} methane, 1,1-bis{(2-hydroxyethoxy)phenyl} ethane, 1,1-bis{(2-hydroxyethoxy)phenyl}-1-phenylethane, 2,2-bis{(2-hydroxyethoxy)phenyl} propane, 2,2-bis{(2-hydroxyethoxy)-3-methylphenyl} propane, 1,1-bis{(2-hydroxyethoxy)phenyl}-3,3,5-trimethylcyclohexane, 2,2-bis{4-(2-hydroxyethoxy)-3,3'-biphenyl} propane, 2,2-bis{(2-hydroxyethoxy)-3-isopropylphenyl} propane, 2,2-bis{3-t-butyl-4-(2-hydroxyethoxy)phenyl}propane, 2,2-bis {(2-hydroxyethoxy)phenyl} butane, 2,2-bis{(2-hydroxyethoxy)phenyl}-4-methylpentane, 2,2-bis{(2-hydroxyethoxy)phenyl} octane, 1,1-bis{(2-hydroxyethoxy)phenyl}decane, 2,2-bis {3-bromo-4-(2-hydroxyethoxy)phenyl} propane, 2,2-bis {3,5-dimethyl-4-(2-hydroxyethoxy)phenyl} propane, 2,2-bis{3-cyclohexyl-4-(2-hydroxyethoxy)phenyl} propane, 1,1-bis{3-cyclohexyl-4-(2-hydroxyethoxy)phenyl} cyclohexane, bis{(2-hydroxyethoxy)phenyl}diphenylmethane, 9,9-bis{(2-hydroxyethoxy)phenyl} fluorene, 9,9-bis {4-(2-hydroxyethoxy)-3-methylphenyl} fluorene, 1,1-bis{(2-hydroxyethoxy)phenyl} cyclohexane, 1,1-bis{(2-hydroxyethoxy)phenyl} cyclopentane, 4,4'-bis(2-hydroxyethoxy) diphenyl ether, 4,4'-bis(2-hydroxyethoxy)-3,3'-dimethyl diphenyl ether, 1,3-bis[2-{(2-hydroxyethoxy)phenyl}propyl]benzene, 1,4-bis[2-{(2-hydroxyethoxy)phenyl}propyl] benzene, 1,4-bis{(2-hydroxyethoxy) phenyl} cyclohexane, 1,3-bis{(2-hydroxyethoxy)phenyl} cyclohexane, 4,8-bis{(2-hydroxyethoxy)phenyl}tricyclo[5.2.1.02.6] decane, 1,3-bis{ (2-hydroxyethoxy)phenyl}-5,7-dimethyladamantane, 3,9-bis(2-hydroxy-1,1-dimethylethyl)-2,4,8,10-tetraoxaspiro(5, 5) undecane, 1,4:3,6-dianhydro-D-sorbitol (isosorbide), 1,4: 3,6-dianhydro-D-mannitol (isomannide), and 1,4:3,6-dianhydro-L-iditol (isoidide).

Among these, aromatic bisphenols are preferable. Among these, 1,1-bis(4-hydroxyphenyl)-1-phenylethane, 2,2-bis(4-hydroxyphenyl) propane, 2,2-bis(4-hydroxy-3-methylphenyl) propane, 1,1-bis(4-hydroxyphenyl) cyclohexane, 1,1-bis(4-hydroxyphenyl)-3,3,5-trimethyl cyclohexane, 4,4'-sulfonyldiphenol, 2,2'-dimethyl-4,4'-sulfonyldiphenol, 9,9-bis(4-hydroxy-3-methylphenyl) fluorene, 1,3-bis{2-(4-hydroxyphenyl)propyl} benzene, 1,4-bis{2-(4-hydroxyphenyl)propyl} benzene and bisphenol compounds represented by the following general formula (3) are preferable.

2,2-bis(4-hydroxyphenyl) propane, 1,1-bis(4-hydroxyphenyl) cyclohexane, 4,4'-sulfonyldiphenol and 9,9-bis(4-hydroxy-3-methylphenyl) fluorene, and bisphenol compound represented by the above mentioned formula (3) are particularly preferable. Among these, 2,2-bis(4-hydroxyphenyl) propane having superior strength and favorable durability is most preferable. In addition, these may be used alone or two or more types may be used in combination.

The polycarbonate resin used as Component A of the present invention may also be a branched polycarbonate resin by combining the use of a branching agent with the aforementioned dihydroxy compound. Examples of polyfunctional aromatic compounds having three or more functional groups used in this branched polycarbonate resin include fluoroglucine, fluoroglucide, or trisphenols such as 4,6-dimethyl-2,4,6-tris(4-hydroxydiphenyl) heptene, 2,2,4, 6-trimethyl-2,4,6-tris(4-hydroxyphenyl) heptane, 1,3,5-tris (4-hydroxyphenyl) benzene, 1,1,1-tris(4-hydroxyphenyl) ethane, 1,1,1-tris(3,5-dimethyl-4-hydroxyphenyl) ethane, 2,6-bis(2-hydroxy-5-methylbenzyl)-4-methyl phenol and 4-{4-[1,1-bis(4-hydroxyphenyl)ethyl]benzene}-α,α-dimethylbenzyl phenol.

In addition, other examples include tetra(4-hydroxyphenyl) methane, bis(2,4-dihydroxyphenyl) ketone and 1,4-bis (4,4-dihydroxytriphenylmethyl) benzene, trimellitic acid, pyromellitic acid, benzophenone tetracarboxylic acid and acid chlorides thereof. Among these, 1,1,1-tris(4-hydroxyphenyl) ethane and 1,1,1-tris(3,5-dimethyl-4-hydroxyphenyl) ethane are preferable, and 1,1,1-tris(4-hydroxyphenyl) ethane is particularly preferable.

These polycarbonate resins are produced by a reaction means that is itself known for producing ordinary polycarbonate resins, and is produced by, for example, reacting a carbonate precursor substance such as phosgene or carbonic diester with an aromatic dihydroxy component. The following provides a brief explanation of the basic means for carrying out this production method.

In a reaction using phosgene, for example, for the carbonate precursor substance, the reaction is normally carried out in the presence of an acid binder and solvent. Examples of acid binders used include alkaline metal hydroxides such as sodium hydroxide or potassium hydroxide and amine compounds such as pyridine. Examples of solvents used include halogenated hydrocarbons such as methylene chloride or chlorobenzene. In addition, a catalyst such as a tertiary amine or quaternary ammonium salt can also be used to accelerate the reaction. In that case, the reaction temperature is normally 0° C. to 40° C. and the reaction time is several minutes to 5 hours.

A transesterification reaction using a carbonic diester for the carbonate precursor substance is carried out by a method consisting of stirring a prescribed ratio of aromatic dihydroxy component with the carbonic diester in an inert gas atmosphere while heating followed by distilling off the alcohol or phenol formed. Although differing according to the boiling point of the alcohol or phenol formed, the reaction temperature is normally within the range of 120° C. to 300° C. The reaction is completed while distilling off the alcohol or phenol formed, by reducing pressure starting in an early stage of the reaction. In addition, a catalyst normally used in a transesterification reaction can be used to accelerate the reaction. Examples of the carbonic diester used in the aforementioned transesterification reaction include diphenyl carbonate, dinaphthyl carbonate, bis(diphenyl) carbonate, dimethyl carbonate, diethyl carbonate and dibutyl carbonate. Among these, diphenyl carbonate is particularly preferable.

A terminating agent is preferably used in the polymerization reaction of the present invention. A terminating agent is used to adjust molecular weight, and since the ends of the resulting polycarbonate resin are blocked, it demonstrates superior heat stability in comparison with those in which the ends are not blocked. The terminating agent may be the monofunctional phenols represented by the following formulae [4] to [6]:

[Chem. 6]

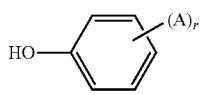

[4]

(in the formula [4], A represents a hydrogen atom, alkyl group having 1 to 9 carbon atoms, alkylphenyl group (wherein the number of carbon atoms of the alkyl moiety is 1 to 9), phenyl group, or phenylalkyl group (wherein the number of carbon atoms of the alkyl moiety is 1 to 9), and r represents an integer of 1 to 5 and preferably 1 to 3); and,

[Chem. 7]

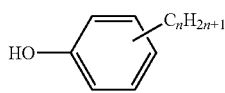

[5]

[Chem. 8]

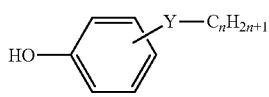

[6]

(wherein, in formulae [5] and [6], Y represents —R—O—, —R—CO—O— or —R—O—CO—, R represents a single bond or divalent aliphatic hydrocarbon group having 1 to 10 carbon atoms and preferably 1 to 5 carbon atoms, and n represents an integer of 10 to 50).

Specific examples of monofunctional phenols represented by the aforementioned general formula [4] include phenol, isopropyl phenol, p-tert-butyl phenol, p-cresol, p-cumyl phenol, 2-phenyl phenol, 4-phenyl phenol and isooctyl phenol.

In addition, the monofunctional phenol represented by the aforementioned formulas [5] and [6] is a phenol having a long chain alkyl group or aliphatic ester group as a substituent thereof, and when the ends of a polycarbonate resin are blocked using these monofunctional phenols, not only do the monofunctional phenols function as terminating agents or molecular weight adjusters, but they also improve melt flowability of the resin and facilitate molding processing while also having the effect of lowering the water absorption rate of the resin, and are therefore used preferably.

The substituted phenol represented by the aforementioned general formula [5] is preferably that in which n is 10 to 30 and particularly preferably that in which n is 10 to 26. Specific examples thereof include decyl phenol, dodecyl phenol, tetradecyl phenol, hexadecyl phenol, octadecyl phenol, eicosyl phenol, docosyl phenol and triacontyl phenol.

In addition, compounds in which Y is —R—CO—O— and R is a single bond are suitable as the substituted phenol of the aforementioned general formula (6), and those in which n is 10 to 30, and particularly 10 to 26, are preferable. Specific examples thereof include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

Among these monofunctional phenols, monofunctional phenols represented by the aforementioned general formula [4] are preferable, alkyl-substituted or phenylalkyl-substituted phenols are more preferable, and p-tert-butyl phenol, p-cumyl phenol or 2-phenyl phenol is particularly preferable. The terminating agent of these monofunctional phenols is preferably introduced into the ends at least at 5 mol % and preferably at least 10 mol % based on all ends of the resulting polycarbonate resin, and the terminating agent may be used alone or two or more types may be used as a mixture.

The polycarbonate resin used as Component A of the present invention may be a polyester carbonate obtained by copolymerizing an aromatic dicarboxylic acid such as terephthalic acid, isophthalic acid or naphthalene dicarboxylic acid, or a derivative thereof, within a range that does not impair the object of the present invention.

The viscosity-average molecular weight of the polycarbonate resin used as Component A of the present invention is preferably within the range of 12,500 to 50,000, more preferably within the range of 16,000 to 30,000, even more preferably within the range of 18,000 to 28,000 and most preferably within the range of 19,000 to 26,000. If the viscosity-average molecular weight exceeds 50,000, melt viscosity becomes excessively high and moldability may be inferior, while if the viscosity-average molecular weight is less than 12,500, problems with mechanical strength may occur. Incidentally, viscosity-average molecular weight as referred to in the present invention is calculated by first determining specific viscosity calculated with the following equation using an Ostwald viscometer from a solution obtained by dissolving 0.7 g of polycarbonate resin in 100 ml of methylene chloride at 20° C.:

specific viscosity $(\eta_{sp}) = (t - t_0)/t_0$ (wherein, $t_0$ is the falling number in seconds of the methylene chloride and t is the falling number in seconds of the sample solution), followed by determining viscosity-average molecular weight M by entering the determined specific viscosity into the following equation:

$\eta_{sp}/c = [\eta] + 0.45 \times [\eta]^2 c$ (wherein, $[\eta]$ represents intrinsic viscosity)

$[\eta] = 1.23 \times 10^{-4} M^{0.83}$ $c = 0.7$.

(Component B: Fibrous Filler)

Examples of the fibrous filler used as Component B in the present invention include fibrous inorganic fillers such as glass fiber, carbon fiber, milled carbon fiber, metal fiber, asbestos, rock wool, ceramic fiber, slag fiber, potassium titanate whisker, boron whisker, aluminum borate whisker, calcium carbonate whisker, titanium oxide whisker, wollastonite, xonotlite, palygorskite (attapulgite) and sepiolite. In addition, other examples include fibrous heat-resistant organic fillers represented by heat-resistant organic fibers such as aramid fiber, polyimide fiber or polybenzthiazole fiber.

In addition, examples of these fillers include fibrous fillers having a dissimilar material such as a metal or metal oxide coated on the surface thereof. Examples of fillers having a dissimilar material coated on the surface thereof include metal-coated glass fiber and metal-coated carbon fiber. There are no particular limitations on the method used to coat the surface with a dissimilar material and examples thereof include various types of known plating methods (such as electrolytic plating, non-electrolytic plating or hot dipping), vacuum deposition, ion plating, CVD (such as thermal CVD, MOCVD or plasma CVD), PVD and sputtering.

Among these fibrous fillers, glass fiber, carbon fiber, milled carbon fiber and aramid fiber are preferable. Among these, glass fiber and carbon fiber are more preferable. The fiber diameter of the fibrous filler used as Component B of the present invention is preferably within the range of 0.1 μm to 20 μm. The upper limit of fiber diameter is more preferably 18 μm and even more preferably 15 μm. On the other hand, the lower limit of fiber diameter is more preferably 1 μm and even more preferably 6 μm. Fiber diameter as referred to here refers to number average fiber diameter. Furthermore, this number average fiber diameter is the value calculated from images obtained by observing residue collected after dissolving a molded article in solvent or decomposing resin with a basic compound and carbonized residue collected after having carbonized in a crucible with a scanning electron microscope.

In the case the fibrous filler used as Component B of the present invention is glass fiber, various types of glass compositions such as those represented by A-glass, C-glass or E-glass are applied for the glass composition of the glass fiber and there are no particular limitations thereon. This glass filler may contain components such as $TiO_2$, $SO_3$ or $P_2O_5$ as necessary. Among these, E-glass (non-alkaline glass) is more preferable.

The surface of this glass fiber is preferably treated with a commonly known surface treatment agent such as a silane coupling agent, titanate coupling agent or aluminate coupling agent from the viewpoint of improving mechanical strength. In addition, that which has been subjected to sizing treatment with an olefin-based resin, styrene-based resin, acrylic-based resin, polyester-based resin, epoxy-based resin or urethane-based resin and the like is preferable, and an epoxy-based resin or urethane-based resin is particularly preferable from the viewpoint of mechanical strength. The amount of sizing agent applied to the sized glass fiber is preferably 0.1% by weight to 3% by weight and more preferably 0.2% by weight to 1% by weight based on 100% by weight of glass fiber.

Glass fiber having a flat cross-section can also be used for the fibrous filler used as Component B of the present invention. The average value of the major axis of the fiber cross-section of this glass fiber having a flat cross-section is preferably 10 μm to 50 μm, more preferably 15 μm to 40 μm and even more preferably 20 μm to 35 μm, and average value of the ratio of the major axis to the minor axis (major axis/minor axis) is preferably 1.5 to 8, more preferably 2 to 6 and even more preferably 2.5 to 5. In the case of having used glass fiber having a flat cross-section for which the average value of the ratio of the major axis to the minor axis is within these ranges, anisotropy is improved considerably in comparison with having used fiber having a non-circular cross-section in which this average value is less than 1.5. In addition, in addition to being flat, examples of other flat cross-sectional shapes include an elliptical, eyebrow-shaped and trifoliate cross-sections as well as non-circular cross-sectional shapes similar thereto.

Among these, a flat shape is preferable from the viewpoints of mechanical strength and low anisotropy. In addition, the ratio of average fiber length to average fiber diameter (aspect ratio) of glass fiber having a flat cross-section is preferably 2 to 120, more preferably 2.5 to 70 and even more preferably 3 to 50. If the ratio of fiber length to average fiber diameter is less than 2, there are cases in which the effect of improving mechanical strength is diminished, while if the ratio of fiber length to average fiber diameter exceeds 120, in addition to causing an increase in anisotropy, the appearance of molded articles may become poor.

The average fiber diameter of this glass fiber having a flat cross-section refers to the number average fiber diameter when the flat cross-sectional shape is converted to a circular shape of the same area. In addition, average fiber length refers to the number average fiber length in the reinforced polycarbonate resin composition of the present invention. Incidentally, the number average fiber length is the value calculated with an image analyzer from an image obtained by observing residue of the filler collected during treatment of a molded article by high-temperature ashing, solvent dissolution or chemical decomposition and the like with an optical microscope. In addition, when calculating this value, the value is acquired by a method in which fibers of a length equal to or less than a target fiber diameter are not counted.

The content of fibrous filler used as Component B in the present invention is 5 parts by weight to 50 parts by weight, preferably 5 parts by weight to 35 parts by weight, more preferably 10 parts by weight to 35 parts by weight and even more preferably 10 parts by weight to 30 parts by weight based on a total of 100 parts by weight of Component A and Component B. If the content of Component B is less than 5 parts by weight, strength and heat resistance are inadequate, while if the content of Component B exceeds 50 parts by weight, not only does impact resistance decrease, but heat stability and flame retardation become poor.

(Component C: Fluororesin)

The fluororesin of Component C in the present invention is fluororesin (Component C-I) or fluororesin (Component C-II).

(Component C-I)

The melting point of the fluororesin (Component C-I) is 200° C. to 280° C., preferably 210° C. to 280° C. and more preferably 230° C. to 280° C. The lower limit of the melting point is preferably 231° C., more preferably 240° C. and even more preferably 250° C. The upper limit of the melting point is preferably 278° C. and more preferably 276° C. If the melting point of the fluororesin is lower than 200° C., heat resistance decreases. If the melting point is higher than 280° C., compatibility with the polycarbonate resin decreases and impact resistance decreases.

The fluororesin (Component C-I) is a copolymer containing polymerization units represented by the following general formulas (1) and (2). Impact resistance decreases in the case a fluororesin is used that does not contain these structures.

[Chem. 9]

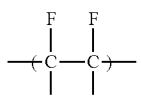

[1]

[Chem. 10]

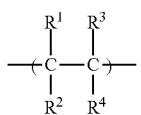

[2]

(in the aforementioned general formula (2), $R^1$, $R^2$, $R^3$ and $R^4$ respectively and independently represent a hydrogen atom or alkyl group having 1 to 5 carbon atoms.)

The polymerization unit represented by the aforementioned formula (1) is a polymerization unit derived from tetrafluoroethylene.

In the aforementioned general formula (2), examples of the alkyl groups having 1 to 5 carbon atoms represented by $R^1$, $R^2$, $R^3$ and $R^4$ include a methyl group, ethyl group and propyl group. Examples of the polymerization unit represented by the aforementioned formula (2) include polymerization units derived from ethylene, propylene, 1-butene, 1-pentene, isobutylene, 3-methyl-1-butene, 1-hexene, 3-methyl-1-pentene, 1-heptene and 3-methyl-1-hexene. Among these, polymerization units derived from ethylene, propylene, 1-butene or isobutylene are preferable. Polymerization units derived from ethylene or propylene are more preferable, and polymerization units derived from ethylene are most preferable. Furthermore, these polymerization units may be used alone or as a mixture of two or more types thereof.

The monomer ratio (2)/(1) of the monomers represented by the aforementioned general formulas (2) and (1) composing the fluororesin (Component C-I) is preferably 95/5 to 5/95, more preferably 90/10 to 10/90, even more preferably 80/20 to 20/80, and most preferably 70/30 to 30/70. In addition, the fluororesin (Component C-I) is preferably comprised only of polymerization units represented by the aforementioned general formulas (1) and (2).

The content of the fluororesin (Component C-I) is 2 parts by weight to 45 parts by weight, preferably 2 parts by weigh to 30 parts by weight and more preferably 2 parts by weight to 15 parts by weight based on a total of 100 parts by weight of Component A and Component B. In the case the content of the fluororesin (Component C-I) is less than 2 parts by weight, impact resistance decreases, while in the case that content exceeds 45 parts by weight, not only does impact resistance decrease, but strength also decreases.

(Component C-II)

The melting point of the fluororesin (Component C-II) is 240° C. to 300° C., preferably 250° C. to 300° C. and more preferably 250° C. to 290° C. The lower limit of the melting point is preferably 245° C. and more preferably 247° C. The upper limit of the melting point is preferably 296° C. and more preferably 295° C. If the melting point of the fluororesin is lower than 240° C., heat resistance decreases. On the other hand, if the melting point is higher than 300° C., compatibility with the polycarbonate resin decreases and impact resistance also decreases.

The 5% weight loss temperature of the fluororesin (Component C-II) as determined by thermogravimetric analysis (TGA) is 470° C. or higher, preferably 480° C. or higher and more preferably 490° C. or higher. Heat stability decreases if the 5% weight loss temperature of the fluororesin is lower than 470° C.

The fluororesin (Component C-II) is a copolymer containing the polymerization units represented by the following general formulas (1) and (2). Heat resistance or impact resistance decreases if a fluororesin not containing these structures is used.

[Chem. 11]

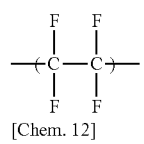

[1]

[Chem. 12]

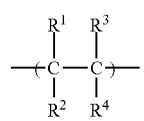

[2]

(in the aforementioned general formula (2), $R^1$, $R^2$, $R^3$ and $R^4$ respectively and independently represent a fluorine atom or fluoroalkyl group having 1 to 5 carbon atoms, provided that $R^1$, $R^2$, $R^3$ and $R^4$ are not all fluorine atoms).

The polymerization unit represented by the aforementioned general formula (1) is a polymerization unit derived from tetrafluoroethylene.

Examples of fluoroalkyl groups having 1 to 5 carbon atoms in the polymerization unit represented by the aforementioned general formula (2) include a trifluoromethyl group and pentafluoropropyl group. A polymerization unit derived from hexafluoropropylene, octafluoro-1-butene, decafluoro-1-butene, octafluoroisobutylene or perfluorobutylethylene is preferable for the polymerization unit represented by the aforementioned formula (2). Among these, polymerization units derived from hexafluoropropylene or perfluorobutylethylene are more preferable and a polymerization unit derived from hexafluoropropylene is even more preferable. Furthermore, these polymerization units may be used alone or as a mixture of two or more types thereof.

The weight ratio (1)/(2) of the monomers represented by the aforementioned formulas (1) and (2) composing the fluororesin (Component C-II) is preferably 98/2 to 50/50, more preferably 98/2 to 60/40, even more preferably 98/2 to 70/30, still more preferably 95/5 to 70/30 and most preferably 95/5 to 80/20.

The content of the fluororesin (Component C-II) is 2 parts by weight to 45 parts by weight, preferably 2 parts by weight to 30 parts by weight and more preferably 2 parts by weight to 15 parts by weight based on 100 parts by weight of the component comprised of Component A and Component B. In the case the content of the fluororesin (Component C-II) is less than 2 parts by weight, impact resistance decreases, while in the case the content is greater than 45 parts by weight, not only does impact resistance decrease, but strength also decreases. In addition, the fluororesin (Component C-II) is preferably comprised only of the polymerization units represented by the aforementioned general formulas (1) and (2).

(Other Additives)

Additives are advantageously used in the reinforced polycarbonate resin composition of the present invention to improve the heat stability and design quality thereof. The following provides a detailed explanation of these additives.

(I) Heat Stabilizers

The reinforced polycarbonate resin composition of the present invention can incorporate various known types of stabilizers. Examples of stabilizers include phosphorous-based stabilizers and hindered phenol-based antioxidants.

(i) Phosphorous-Based Stabilizers

The reinforced polycarbonate resin composition of the present invention preferably incorporates a phosphorous-based stabilizer to a degree that does not promote hydrolysis. This phosphorous-based stabilizer improves heat stability during production or molding processing and improves mechanical properties, hue and molding stability. Examples of phosphorous-based stabilizers include phosphorous acid, phosphoric acid, phosphonous acid, phosphonic acid, esters thereof and tertiary phosphines.

Specific examples of phosphite compounds include triphenyl phosphite, tris(nonylphenyl) phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, 2,2-methylenebis(4,6-di-tert-butylphenyl) octyl phosphite, tris(diethylphenyl) phosphite, tris(diisopropylphenyl) phosphite, tris(di-n-butylphenyl) phosphite, tris(2,4-di-tert-butylphenyl) phosphite, tris(2,6-di-tert-butylphenyl) phosphite, distearyl pentaerythritol diphosphite, bis(2,4-di-tert-butylphenyl) pentaerythritol diphosphite, bis(2,6-di-tert-butyl-4-methylphenyl) pentaerythritol diphosphite, bis(2,6-di-tert-butyl-4-ethylphenyl) pentaerythritol diphosphite, phenyl bisphenol A pentaerythritol diphosphite, bis(nonylphenyl) pentaerythritol diphosphite and dicyclohexyl pentaerythritol diphosphite.

Moreover, compounds that react with divalent phenols and have a cyclic structure can also be used as other phosphite compounds. Examples thereof include 2,2'-methylenebis(4,6-di-tert-butylphenyl) (2,4-di-tert-butylphenyl) phosphite, 2,2'-methylenebis(4,6-di-tert-butylphenyl) (2-tert-butyl-4-methylphenyl) phosphite, 2,2'-methylenebis(4-methyl-6-tert-butylphenyl) (2-tert-butyl-4-methylphenyl) phosphite and 2,2'-ethylidenebis(4-methyl-6-tert-butylphenyl) (2-tert-butyl-4-methylphenyl) phosphite.

Examples of phosphate compounds include tributyl phosphate, trimethyl phosphate, tricresyl phosphate, triphenyl phosphate, trichlorophenyl phosphate, triethyl phosphate, diphenylcresyl phosphate, diphenyl monoorthoxenyl phosphate, tributoxyethyl phosphate, dibutyl phosphate, dioctyl phosphate and diisopropyl phosphate. Triphenyl phosphate and trimethyl phosphate are preferable.

Examples of phosphonite compounds include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-4-phenyl-phenyl phosphonite, bis(2,6-di-tert-butylphenyl)-4-phenyl-phenyl phosphonite and bis(2,6-di-tert-butylphenyl)-3-phenyl-phenyl phosphonite.

Among these, tetrakis(di-tert-butylphenyl)-biphenylene diphosphonite and bis(di-tert-butylphenyl)-phenyl-phenyl phosphonite are preferable. In addition, tetrakis(2,4-di-tert-butylphenyl)-biphenylene diphosphonite and bis(2,4-di-tert-butylphenyl)-phenyl-phenyl phosphonite are more preferable. These phosphonite compounds can be used in combination with phosphite compounds having aryl groups substituted with two or more of the aforementioned alkyl group, and are thereby preferable.

Examples of phosphonate compounds include dimethyl benzenephosphonate, diethyl benzenephosphonate and dipropyl benzenephosphonate. Examples of tertiary phosphines include triethylphosphine, tripropylphosphine, tributylphosphine, trioctylphosphine, triamylphosphine, dimethylphenylphosphine, dibutylphenylphosphine, diphenylmethylphosphine, diphenyloctylphosphine, triphenylphosphine, tri-p-tolylphosphine, trinaphthylphosphine and diphenylbenzylphosphine.

The tertiary phosphine is particularly preferably triphenylphosphine. One type of the aforementioned phosphorous-based stabilizers can be used alone or two or more types can be used as a mixture. Among the aforementioned phosphorous-based stabilizers, alkyl phosphates represented by trimethyl phosphate are preferably incorporated. In addition, the combined use of these alkyl phosphate compounds with a phosphite compound and/or phosphonite compound also constitutes a preferable aspect.

(ii) Hindered Phenol-Based Stabilizers

A hindered phenol-based stabilizer can be incorporated in the reinforced polycarbonate resin composition of the present invention. The incorporation thereof demonstrates the effects of, for example, inhibiting poor hue during molding processing and poor hue during long-term use.

Examples of hindered phenol-based stabilizers include ca-tocopherol, butylhydroxytoluene, sinapyl alcohol, vitamin E, n-octadecyl-β-(4'-hydroxy-3',5'-di-tert-butylphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl) phenol, 3,5-di-tert-butyl-4-hydroxybenzyl phosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylenebis(6-α-methylbenzyl-p-cresol), 2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl) propionate, 1,6-hexandiolbis[3-(3,5-di-tert-butyl-4-hydroxyphenyl) propionate, bis[2-tert-butyl-4-methyl-6-(3-tert-butyl-5-methyl-2-hydroxybenzyl)phenyl] terephthalate, 3,9-bis{2-[3-(3-tert-butyl-4-hydroxy-5-methylphenyl)propionyloxy]-1,1-dimethylethyl}-2,4,8,10-tetraoxyspiro[5,5] undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl) sulfide, 4,4'-dithiobis(2,6-di-tert-butylphenol), 4,4'-trithiobis(2,6-di-tert-butylphenol), 2,2-thiodiethylene-bis-[3-(3,5-di-tert-butyl-4-hydroxyphenyl)propionate], 2,4-bis(n-octylthio)-6-(4-hydroxy-3',5'-di-tert-butylanilino)-1,3,5-triazine, N,N-hexamethylenebis-(3,5-di-tert-butyl-4-hydroxyhydrocinnamide), N,N'-bis[3-(3,5-di-tert-butyl-4-hydroxyphenyl)propionyl] hydrazine, 1,1,3-tris(2-methyl-4-hydroxy-5-tert-butylphenyl) butane, 1,3,5-trimethyl-2,4,6-tris(3,5-di-tert-butyl-4-hydroxybenzyl) benzene, tris(3,5-di-tert-butyl-4-hydroxyphenyl) isocyanurate, tris(3,5-di-tert-butyl-4-hydroxybenzyl) isocyanurate, 1,3,5-tris(4-tertbutyl-3-hydroxy-2,6-dimethylbenzyl) isocyanurate, 1,3,5-tris2[3(3,5-di-tert-butyl-4-hydroxyphenyl)propionyloxy] ethyl isocyanurate and tetrakis[methylene-3-(3',5'-di-tert-butyl-4-hydroxyphenyl)propionate].

All of these compounds are readily available. The aforementioned hindered phenol-based antioxidants can be used alone or two or more types can be used in combination. The incorporated amount of phosphorous-based stabilizer and hindered phenol-based stabilizer is preferably 0.0001 parts by weight to 1 part by weight, more preferably 0.001 part by weight to 0.5 parts by weight and even more preferably 0.005 parts by weight to 0.3 parts by weight based on 100 parts by weight of the components comprised of Component A and Component B, respectively.

(iii) Other Heat Stabilizers

The reinforced polycarbonate resin composition of the present invention can also incorporate other heat stabilizers other than the aforementioned phosphorous-based stabilizers and hindered phenol-based stabilizers. Lactone-based stabilizers represented by the reaction product of 3-hydroxy-5,7-di-tert-butylfuran-2-one and o-oxylene, for example, are preferable examples of these other heat stabilizers. Details regarding these stabilizers are described in Japanese Unexamined Patent Publication No. H07-233160. This compound is commercially available as Irganox HP-136™ (Ciba Specialty Chemicals Inc.). Moreover stabilizers obtained by mixing this compound with various types of phosphite compounds and hindered phenol compounds are commercially available. A preferable example thereof is Irganox HP-2921 manufactured by the aforementioned manufacturer. The incorporated amount of lactone-based stabilizer is preferably 0.0005 parts by weight to 0.05 parts by weight and more preferably 0.001 part by weight to 0.03 parts by weight based on 100 parts by weight of the component comprised of Component A and Component B.

In addition, other examples of stabilizers include sulfur-containing stabilizers such as pentaerythritol tetrakis(3-mercaptopropionate), pentaerythritol tetrakis(3-laurylthiopropionate) and glycerol-3-stearylthiopropionate. The incorporated amount of these sulfur-containing stabilizers is preferably 0.001 part by weight to 0.1 part by weight and more preferably 0.01 part by weight to 0.08 parts by weight based on 100 parts by weight of the component comprised of Component A and Component B.

The reinforced polycarbonate resin composition of the present invention can incorporate an epoxy compound as necessary. This epoxy compound is incorporated for the purpose of inhibiting mold corrosion, and basically all compounds having an epoxy functional group can be applied.

Specific preferable examples of epoxy compounds include 3,4-epoxycyclohexylmethyl-3',4'-epoxycyclohexyl carboxylate, 1,2-epoxy-4-(2-oxyranil) cyclohexane addition products of 2,2-bis(hydroxymethyl)-1-butanol, copolymers of methyl methacrylate and glycidyl methacrylate and copolymers of styrene and glycidyl methacrylate. The added amount of this compound is preferably 0.003 parts by weight to 0.2 parts by weight, more preferably 0.004 parts by weight to 0.15 parts by weight and even more preferably 0.005 parts by weight to 0.1 part by weight based on 100 parts by weight of the component comprised of Component A and Component B.

(II) Flame Retardants

The reinforced polycarbonate resin composition of the present invention can incorporate a flame retardant. Incorporation of these compounds not only improves flame retardation, but also results in improvement of, for example, antistatic properties, fluidity, rigidity and heat stability based on the properties of each compound. Examples of flame retardants include (i) organic metal salt-based flame retardants (such as organic alkaline (earth) metal sulfonates, organic metal borate-based flame retardants or organic metal stannate-based flame retardants), (ii) organic phosphorous-based flame retardants (such as organic group-containing monophosphate compounds, phosphate oligomer compounds, phosphonate oligomer compounds, phosphonitrile oligomer compounds or phosphonic amide compounds), (iii) silicon-based flame retardants comprised of silicone compounds, and (iv) fibrillated PTFE. Among these, organic metal salt-based flame retardants and organic phosphorous-based flame retardants are preferable. One type of these compounds may be used or two or more types may be compounded.

(i) Organic Metal Salt-Based Flame Retardants

The organic metal salt compound is an alkaline (earth) metal salt, and preferably an organic alkaline (earth) metal sulfonate, having 1 to 50 carbon atoms and preferably 1 to 40 carbon atoms. This organic alkaline (earth) metal sulfonate contains a metal salt having 1 to 10 carbon atoms and preferably 2 to 8 carbon atoms of a fluorine-substituted alkyl sulfonate in the manner of a metal salt of a perfluoroalkylsulfonic acid and an alkaline metal salt or alkaline earth metal salt. In addition, the organic alkaline (earth) metal sulfonate contains a metal salt having 7 to 50 carbon atoms and preferably 7 to 40 carbon atoms of an aromatic sulfonic acid and an alkaline metal or alkaline earth metal.

Examples of the alkali metal constituting the metal salt include lithium, sodium, potassium, rubidium and cesium. Examples of the alkali earth metal include beryllium, magnesium, calcium, strontium and barium. The alkali metal salt is preferable. Out of these alkali metals, rubidium and cesium having a larger ion radius are preferred when the requirement for transparency is higher. However, as they cannot be used for all purposes and it is difficult to refine them, they may become disadvantageous in terms of cost. Meanwhile, metals having a smaller ion radius such as lithium and sodium may become disadvantageous in terms of flame retardancy. In consideration of these, an alkali metal contained in the sulfonic acid alkali metal salt may be selected. A sulfonic acid potassium salt having good balance among properties is most preferred in all aspects. This potassium salt and a sulfonic acid alkali metal salt comprising another alkali metal may be used in combination.

Examples of the alkali metal salt of a perfluoroalkylsulfonic acid include potassium trifluoromethanesulfonate, potassium perfluorobutanesulfonate, potassium perfluorohexanesulfonate, potassium perfluorooctanesulfonate, sodium pentafluoroethanesulfonate, sodium perfluorobutanesulfonate, sodium perfluorooctanesulfonate, lithium trifluoromethanesulfonate, lithium perfluorobutanesulfonate, lithium perfluoroheptanesulfonate, cesium trifluoromethanesulfonate, cesium perfluorobutanesulfonate, cesium perfluorooctanesulfonate, cesium perfluorohexanesulfonate, rubidium perfluorobutanesulfonate and rubidium perfluorohexanesulfonate. They may be used alone or in combination of two or more. The number of carbon atoms of the perfluoroalkyl group is preferably 1 to 18, more preferably 1 to 10, much more preferably 1 to 8.

Out of these, potassium perfluorobutanesulfonate is particularly preferred. In general, a fluoride ion (F') is contained in the alkali (earth) metal salt of a perfluoroalkylsulfonic acid comprising an alkali metal in no small measure. Since the existence of the fluoride ion may cause the deterioration of flame retardancy, it is preferably reduced as much as possible. The content of the fluoride ion can be measured by ion chromatography. The content of the fluoride ion is preferably not more than 100 ppm, more preferably not more than 40 ppm, particularly preferably not more than 10 ppm. It is advantageously not less than 0.2 ppm from the viewpoint of production efficiency.

The alkali (earth) metal salt of a perfluoroalkylsufonic acid whose fluoride ion content has been reduced can be produced by employing a known production process such as one in which the content of the fluoride ion in the raw material is reduced when a fluorine-containing organic metal salt is produced, one in which hydrogen fluoride obtained by a reaction is removed by a gas generated at the time of the reaction or heating, or one in which the amount of the fluoride ion is reduced by purification means such as recrystallization and reprecipitation in the production of a fluorine-containing organic metal salt. Since an organic metal salt-based flame retardant relatively easily dissolves in water, it is preferably produced by using ion exchange water, especially water having an electric resistance of not less than 18 MΩ-cm, that is, an electric conductivity of about not more than 0.55 μS/cm to dissolve and clean it at a temperature higher than normal temperature and then cooling it for recrystallization.

Examples of the alkali (earth) metal salt of an aromatic sulfonic acid include disodium diphenylsulfide-4,4'-disulfonate, dipotassium diphenylsulfide-4,4'-disulfonate, potassium 5-sulfoisophalate, sodium 5-sulfoisophthalate, polysodium polyethylene terephthalate polysulfonate, calcium 1-methoxynaphthalene-4-sulfonate, disodium 4-dodecylphenylether disulfonate, polysodium poly(2,6-dimethylphenylene oxide)polysulfonate, polysodium poly(1,3-phenylene oxide)polysulfonate, polysodium poly(1,4-phenylene oxide)polysulfonate, polypotassium poly(2,6-diphenylphenylene oxide)polysulfonate, lithium poly(2-fluoro-6-butylphenylene oxide)polysulfonate, potassium sulfonate of benzenesulfonate, sodium benzenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenylsulfone-3-sulfonate, potassium diphenylsulfone-3-sulfonate, dipotassium diphenylsulfone-3,3'-disulfonate, dipotassium diphenylsulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophenesulfonate, potassium diphenylsulfoxide-4-sulfonate, formalin condensate of sodium naphthalenesulfonate, and formalin condensate of sodium anthracenesulfonate.

Out of these alkali (earth) metal salts of an aromatic sulfonic acid, potassium salts are preferred. Out of these alkali (earth) metal salts of an aromatic sulfonic acid, potassium diphenylsulfone-3-sulfonate and dipotassium diphenylsulfone-3,3'-disulfonate are more preferred, and a mixture of these (the weight ratio of the former to the latter is 15/85 to 30/70) is particularly preferred.

Organic metal salt other than the alkali (earth) metal salt are preferably alkali (earth) metal salts of a sulfuric acid ester and alkali (earth) metal salts of an aromatic sulfonamide.

The alkali (earth) metal salts of a sulfuric acid ester include alkali (earth) metal salts of a sulfuric acid ester of a monohydric and/or polyhydric alcohol. Examples of the sulfuric acid ester of a monohydric and/or polyhydric alcohol include methyl sulfuric acid esters, ethyl sulfuric acid esters, lauryl sulfuric acid esters, hexadecyl sulfuric acid esters, sulfuric acid esters of a polyoxyethylene alkylphenyl ether, mono-, di-, tri- and tetra-sulfuric acid esters of pentaerythritol, sulfuric acid esters of monoglyceride laurate, sulfuric acid esters of monoglyceride palmitate and sulfuric acid esters of monoglyceride stearate. Out of these alkali (earth) metal salts of sulfuric acid esters, alkali (earth) metal salts of a lauryl sulfuric acid ester are preferred.

The alkali (earth) metal salts of an aromatic sulfonamide include alkali (earth) metal salts of saccharin, N-(p-tolylsulfonyl)-p-toluenesulfoimide, N—(N'-benzylaminocarbonyl)sulfanilimide and N-(phenylcarboxyl)sulfanilimide.

The content of organic metal salt-based flame retardant is preferably 0.001 part by weight to 1 part by weight, more preferably 0.005 parts by weight to 0.5 parts by weight, even more preferably 0.01 part by weight to 0.3 parts by weight, and particularly preferably 0.03 parts by weight to 0.15 parts by weight based on 100 parts by weight of the component comprised of Component A and Component B.

(ii) Organic Phosphorous-Based Flame Retardants

Aryl phosphate compounds or phosphazene compounds are preferably used as organic phosphorous-based flame retardants. These organic phosphorous-based flame retardants are advantageous from the viewpoint of enhancing molding processability due to the plasticizing effect thereof. Although various types of phosphate compounds conventionally known to be flame retardants can be used for the aryl phosphate compound, one type or two or more types of phosphate compounds represented by the following general formula (7) are particularly preferable.

[Chem. 13]

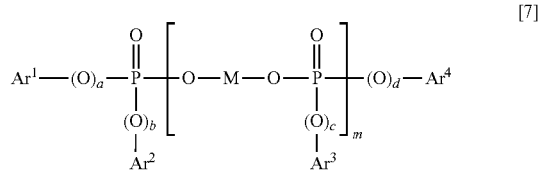

[7]

(In the aforementioned formula, M represents a divalent organic group derived from a divalent phenol, $Ar^1$, $Ar^2$, $Ar^3$ and $Ar^4$ respectively and independently represent a monovalent organic group derived from a monovalent phenol, a, b, c and d respectively and independently represent 0 or 1, m represents an integer of 0 to 5, and in the case of a mixture of phosphate esters having different degrees of polymerization m, m represents the average value thereof and is an integer of 0 to 5.)

The aforementioned phosphate compound may be a mixture of compounds having different values for m, and in the case of such a mixture, the average value of m is preferably within the range of 0.5 to 1.5, more preferably 0.8 to 1.2, even more preferably 0.95 to 1.15 and particularly preferably 1 to 1.14.

Specific preferable examples of the aforementioned divalent phenol from which M is derived include hydroquinone, resorcinol, bis(4-hydroxydiphenyl)methane, bisphenol A, dihydroxydiphenyl, dihydroxynaphthalene, bis(4-hydroxyphenyl)sulfone, bis(4-hydroxyphenyl)ketone and bis(4-hydroxyphenyl)sulfide, and among these, resorcinol, bisphenol A and dihydroxydiphenyl are preferable.

Preferable specific examples of the aforementioned monovalent phenol from which $Ar^1$, $Ar^2$, $Ar^3$ and $Ar^4$ are derived include phenol, cresol, xylenol, isopropylphenol, butylphenol and p-cumylphenol. Among these, phenol and 2,6-dimethylphenol are preferable.

Furthermore, the monovalent phenol may substituted with a halogen atom. Specific examples of phosphate compounds having a group derived from the monovalent phenol include tris(2,4,6-tribromophenyl)phosphate and tris(2,4-dibromophenyl)phosphate and tris(4-bromophenyl)phosphate.

On the other hand, specific examples of phosphate compounds not substituted with a halogen atom preferably include monophosphate compounds such as triphenylphosphate or tri(2,6-xylyl)phosphate, phosphate oligomers consisting mainly of resorcinol bisdi(2,6-xylyl)phosphate, phosphate oligomers consisting mainly of 4,4-dihydroxydiphenylbis(diphenylphosphate), and phosphate ester oligomers consisting mainly of bisphenol A bis(diphenylphosphate). Here, consisting mainly of a certain compound indicates that a small amount of a component having a different degree of polymerization is contained therein, and the component in which m=1 in the aforementioned formula (7) is preferably contained at 80% by weight or more, more preferably 85% by weight or more and even more preferably 90% by weight or more.

Although various types of phosphazene compounds conventionally known to be flame retardants can be used for the phosphazene compound, phosphazene compounds represented by the following formulas (8) and (9) are preferable:

[Chem. 14]

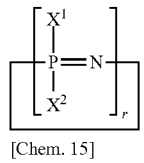

[8]

[Chem. 15]

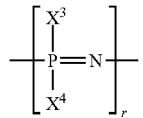

[9]

(wherein, $X^1$, $X^2$, $X^3$ and $X^4$ represent hydrogen atoms, hydroxyl groups, amino groups or organic groups not containing a halogen atom, and r represents an integer of 3 to 10).

Examples of organic groups not containing a halogen atom represented by $X^1$, $X^2$, $X^3$ and $X^4$ in the aforementioned formulas (8) and (9) include an alkoxy group, phenyl group, amino group and allyl group. Among these, a cyclic phosphazene compound represented by the aforementioned formula (8) is preferable, and a cyclic phenoxyphosphazene in which $X^1$ and $X^2$ in the aforementioned formula (8) are phenoxy groups is particularly preferable.

The content of organic phosphorous-based flame retardant is preferably 1 part by weight to 50 parts by weight, more preferably 2 parts by weight to 30 parts by weight and even more preferably 5 parts by weight to 20 parts by weight based on 100 parts by weight of the component comprised of Component A and Component B. If the content of the organic phosphorous-based flame retardant is less than 1 part by weight, it becomes difficult to obtain the effect of flame retardation, while if the content exceeds 50 parts by weight, strand breakage and surging occurs during kneading and extrusion, which may result in the problem of decreased productivity.

(iii) Silicone-Based Flame Retardants

Silicone compounds used as silicone-based flame retardants improve flame retardation through a chemical reaction during combustion. Various types of conventional compounds proposed for use as flame retardants of aromatic polycarbonate resins can be used for these compounds. Silicone compounds are thought to be impart flame retardation effects by themselves binding during combustion or by binding with components derived from a resin to form a structure, or through a reduction reaction during that structure formation, particularly in the case of polycarbonate resins.

Thus, silicone-based flame retardants preferable contain a group that is highly reactive in that reaction, and more specifically, those containing a prescribed amount of at least one type of group selected from alkoxy groups and hydrogen-containing groups (such as a Si—H group) are preferable. The content ratio of these groups (alkoxy groups or Si—H groups) is preferably within the range of 0.1 mol/100 g to 1.2 mol/100 g, more preferably within the range of 0.12 mol/100 g to 1 mol/100 g and even more preferably within the range of 0.15 mol/100 g to 0.6 mol/100 g. This ratio is determined by measuring the amount of hydrogen or alcohol formed per unit weight of the silicone compound by alkalinolysis. Furthermore, alkoxy groups having 1 to 4 carbon atoms are preferable and a methoxy group is particularly preferable for the alkoxy group.

The structure of the silicone compound is typically composed of an arbitrary combination of the following four types of siloxane units. These consist of an M unit, which is a monofunctional siloxane unit such as $(CH_3)_3SiO_{1/2}$, $H(CH_3)_2SiO_{1/2}$, $H_2(CH_3)SiO_{1/2}$, $(CH_3)_2(CH_2\!\!=\!\!CH)SiO_{1/2}$, $(CH_3)_2(C_6H_5)SiO_{1/2}$ or $(CH_3)(C_6H_5)(CH_2\!\!=\!\!CH)SiO_{1/2}$, a D unit, which is a difunctional siloxane unit such as $(CH_3)_2SiO$, $H(CH_3)SiO$, $H_2SiO$, $H(C_6H_5)SiO$, $(CH_3)(CH_2\!\!=\!\!CH)SiO$ or $(C_6H_5)_2SiO$, a T unit, which is a trifunctional siloxane unit such as $(CH_3)SiO_{3/2}$, $(C_3H_7)SiO_{3/2}$, $HSiO_{3/2}$, $(CH_2\!\!=\!\!CH)SiO_{3/2}$ or $(C_6H_5)SiO_{3/2}$, and a Q unit, which is a quadrafunctional siloxane unit represented by $SiO_2$.

Specific examples of the structure of the silicone compound used in the silicone-based flame retardant as represented with rational formulas include Dn, Tp, MmDn, MmTp, MmQq, MmDnTp, MmDnQq, MnTpQq, MnDnTpQq, DnTp, DnQq and DnTpQq. Among these, preferable structures of the silicone compound consist of MmDn, MmTp, MmDnTp and MmDnQq, while more preferable structures consist of MmDn and MmDnTp.

Here, the integers m, n, p and q in the aforementioned rational formulas represent integers of 1 or more representing the degree of polymerization of each siloxane unit and the total of coefficients in each rational formula indicate the average degree of polymerization of the silicone compound. This average degree of polymerization is preferably within the range of 3 to 150, more preferably within the range of 3 to 80, even more preferably within the range of 3 to 60 and particularly preferably within the range of 4 to 40. The more preferable the range of the average degree of polymerization, the better the flame retardation. As will be subsequently described, a silicone compound containing a prescribed amount of aromatic groups demonstrates superior transparency and hue. As a result, favorable reflected light is obtained. In addition, in the case any of m, n, p or q is an integer of 2 or more, the siloxane units having that coefficient can be two or more types of siloxane units having different hydrogen atoms or organic residues bound thereto.

The silicone compound may have a linear or branched structure. In addition, the number of the carbon atoms of organic residues bound to the silicon atom is preferably 1 to 30 and more preferably 1 to 20. Examples of these organic residues include alkyl groups such as a methyl group, ethyl group, propyl group, butyl group, hexyl group or decyl group, cycloalkyl groups in the manner of a cyclohexyl group, aryl groups in the manner of a phenyl group, and aralkyl groups in the manner of a tolyl group. An alkyl group, alkenyl group or aryl group having 1 to 8 carbon atoms is more preferable. An alkyl group having 1 to 4 carbon atoms such as a methyl group, ethyl group or propyl group is particularly preferable for the alkyl group. Moreover, the silicone compound used as a silicone-based flame retardant preferably contains an aryl group.

On the other hand, silane compounds and siloxane compounds used as surface treatment agents of titanium dioxide pigments are clearly distinguished from silicone-based flame retardants of a preferred aspect thereof from the viewpoint of compounds not containing an aryl group allow the obtaining of preferable effects. Silicone compounds used a silicone-based flame retardants may also contain reactive groups other than the aforementioned Si—H group and alkoxy group. Examples of these reactive groups include an amino group, carboxyl group, epoxy group, vinyl group, mercapto group and methacryloxy group.

The content of the silicone-based flame retardant is preferably 0.01 part by weight to 20 parts by weight, more preferably 0.5 parts by weight to 10 parts by weight and even more preferably 1 part by weight to 5 parts by weight based on 100 parts by weight of the component comprised of Component A and Component B.

(iv) Polytetrafluoroethylene Having Fibril Forming Ability (Fibrillated PTFE)

Fibrillated PTFE may be fibrillated PTFE alone or a polytetrafluoroethylene-based mixture of fibrillated PTFE, that is, fibrillated PTFE particles and an organic polymer. The fibrillated PTFE has an extremely high molecular weight and tends to become fibrous through the bonding of PTFE's by an external function such as shear force.

The number average molecular weight thereof is 1,500,000 to several tens of million. The lower limit of the number average molecular weight is preferably 3,000,000. The number average molecular weight is calculated based on the melt viscosity of polytetrafluoroethylene at 380° C. as disclosed by JP-A 6-145520. That is, the fibrillated PTFE as the component E has a melt viscosity at 380° C. measured by the method disclosed by the above publication of $10^7$ to $10^{13}$ poise, preferably $10^8$ to $10^{12}$ poise.

The PTFE in a solid form or an aqueous dispersion form may be used. A PTFE mixture of the fibrillated PTFE and another resin may also be used to improve dispersibility in a resin and further obtain high flame retardancy and mechanical properties.

As disclosed by JP-A 6-145520, a PTFE mixture containing the fibrillated PTFE as the core and low-molecular weight polytetrafluoroethylene as the shell is preferably used as well.

Commercially available products of the fibrillated PTFE include the TEFLON (registered trademark) 6J of Du Pont-Mitsui Fluorochemicals Co., Ltd. and the POLYFLON MPA FA500 and F-201L of Daikin Industries, Ltd.

The fibrillated PTFE mixture obtained by (1) a method in which a fibrillated PTFE aqueous dispersion and an aqueous dispersion or solution of an organic polymer are mixed together and co-precipitation is carried out to obtain a coaggregated mixture (disclosed by JP-A 60-258263 and JP-A 63-154744), (2) a method in which a fibrillated PTFE aqueous dispersion and dried organic polymer particles are mixed together (disclosed by JP-A 4-272957), (3) a method in which a fibrillated PTFE aqueous dispersion and an organic polymer particle solution are uniformly mixed together and their media are removed from the obtained mixture at the same time (disclosed by JP-A 06-220210 and JP-A 08-188653), (4) a method in which a monomer for forming an organic polymer is polymerized in a fibrillated PTFE aqueous dispersion (disclosed by JP-A 9-95583), or (5) a method in which a PTFE aqueous dispersion and an organic polymer dispersion are uniformly mixed together and a vinyl-based monomer is further polymerized in the mixed dispersion to obtain a mixture (disclosed by JP-A 11-29679) may be used.

Examples of commercially available products of these mixed type of fibrillated PTFE include members of the Metablen A Series represented by Metablen A3000™, Metablen A3700™ and Metablen A3800™ manufactured by Mitsubishi Rayon Co., Ltd., SN3300B7™ manufactured by Shine Polymer Technology Co., Ltd., and Blendex B449™ manufactured by GE Specialty Chemicals, Inc.

The content of the fibrillated PTFE in the mixture is preferably 1 to 95 wt %, more preferably 10 to 90 wt %, most preferably 20 to 80 wt % based on 100 wt % of the mixture.

When the content of the fibrillated PTFE in the mixture falls within the above range, the high dispersibility of the fibrillated PTFE can be obtained.

The content of fibrillated PTFE is preferably 0.001 part by weight to 0:5 parts by weight, more preferably 0.01 part by weight to 0.5 parts by weight and even more preferably 0.1 part by weight to 0.5 parts by weight based on 100 parts by weight of the component comprised of Component A and Component B.

(III) Dyeing Pigments

The reinforced polycarbonate resin composition of the present invention is able to provide molded articles demonstrating various design properties by further containing various types of dyeing pigments. Examples of dyeing pigments used in the present invention include perylene-based dyes, coumarin-based dyes, thioindigo-based dyes, anthraquinone-based dyes, thioxanthone-based dyes, ferrocyanides such as Prussian blue, perinone-based dyes, quinoline-based dyes, quinacridone-based dyes, dioxazine-based dyes, isoindolinone-based dyes and phthalocyanine-based dyes.

Moreover, the reinforced polycarbonate resin composition of the present invention also allows the obtaining of favorable metallic coloring by incorporating metallic pigment. Aluminum flake powder is preferable for use as metallic pigment. In addition, even more favorable design effects that take advantage of luminescent colors can be imparted by incorporating fluorescent whiteners and other fluorescent pigments that emit light.

(IV) Fluorescent Whiteners

There are no particular limitations on the fluorescent whitener used in the reinforced polycarbonate resin composition of the present invention provided it is used to improve the hue of a resin and the like to a whitish or bluish-white hue, and examples thereof include stilbene-based, benzimidazole-based, benzoxazole-based, napthalimide-based, rhodamine-based, coumarin-based and oxazine-based compounds. Specific examples thereof include CI Fluorescence Brightener 219:1 and Eastobrite OB-1 manufactured by Eastman Chemical Co., and Hacoll PSR manufactured by Showa Chemical Co., Ltd. Here fluorescent whiteners refer to compounds that have the action of absorbing energy of the ultraviolet component of light rays and radiating this energy to the visible spectrum of light. The content of fluorescent whitener is preferably 0.001 part by weight to 0.1 part by weight and more preferably 0.001 part by weight to 0.05 parts by weight based on 100 parts by weight of the component comprised of Component A and Component B. There is little improvement effect on hue of the composition even if the content of fluorescent whitener exceeds 0.1 parts by weight.

(V) Compounds Having Ability to Absorb Heat Rays

The reinforced polycarbonate resin composition of the present invention can contain a compound that has the ability to absorb heat rays. Examples of these compounds preferably include phthalocyanine-based near infrared absorbers, metal oxide-based near infrared absorbers such as ATO, ITO, iridium oxide, ruthenium oxide, immonium oxide or titanium oxide, and various types of metal compounds having superior near infrared absorption ability such as metal boride-based near infrared absorbers and tungsten oxide-based near infrared absorbers such as lanthanum boride, cerium boride or tungsten boride, and carbon fillers.

MIR-362 manufactured by Mitsui Chemical Corp., for example, is commercially available and easily acquired for use as a phthalocyanine-based near infrared absorber. Examples of carbon fillers include carbon black, graphite (including both natural and artificial graphite) and fullerene. Carbon black and graphite are preferable. These can be used alone or two or more types can be used in combination.

The content of phthalocyanine-based near infrared absorber is preferably 0.0005 parts by weight to 0.2 parts by weight, more preferably 0.0008 parts by weight to 0.1 part by weight and even more preferably 0.001 part by weight to 0.07 parts by weight based on 100 parts by weight of the component comprised of Component A and Component B. The content of metal oxide-based near infrared absorber, metal boride-based near infrared absorber and carbon filler in the reinforced polycarbonate resin composition of the present invention is preferably within the range of 0.1 ppm to 200 ppm (weight ratio) and more preferably within the range of 0.5 ppm to 100 ppm.

(VI) Light Diffusing Agents

A light diffusing effect can be imparted to the reinforced polycarbonate resin composition of the present invention by incorporating a light diffusing agent Examples of this light diffusing agent include polymer fine particles, inorganic fine particles in the manner of calcium carbonate and compounds thereof. The polymer fine particles are known fine particles already known for use as light diffusing agents of polycarbonate resins. More preferable examples include acrylic fine particles and silicone crosslinked particles represented by polyorganosylsesquioxane having a particle diameter of several micrometers. Examples of the shape of the light diffusing agent include spheres, discs, columns and irregular shapes. The spheres are not required to be perfectly spherical, but rather include those that are deformed, and the columns include cubes. The light diffusing agent is preferably spherical and the diameter thereof is more uniform the better. The content of light diffusing agent is preferably 0.005 parts by weight to 20 parts by weight, more preferably 0.01 part by weight to 10 parts by weight, and even more preferably 0.01 part by weight to 3 parts by weight based on 100 parts by weight of the component comprised of Component A and Component B. Furthermore, two or more types of light diffusing agents can be used in combination.

(VII) White Pigments for High Reflection

A reflective effect can be imparted to the reinforced polycarbonate resin composition of the present by incorporating a white pigment for high reflection. Titanium dioxide pigment (and particularly titanium dioxide treated with an organic surface treatment agent such as silicone) is particularly preferable for this white pigment. The content of this white pigment for high reflection is preferably 3 parts by weight to 30 parts by weight and more preferably 8 parts by weight to 25 parts by weight based on 100 parts by weight of the component comprised of Component A and Component B. Furthermore, two or more types of white pigment for high reflection can be used in combination.

(VIII) Ultraviolet Absorbers

The reinforced polycarbonate resin composition of the present invention is able to impart weather resistance by incorporating an ultraviolet absorber.

Examples of the ultraviolet absorbent as benzophenone-based ultraviolet absorbents include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and 2-hydroxy-4-methoxy-2'-carboxybenzophenone.

Examples of the ultraviolet absorbent as benzotriazole-based ultraviolet absorbents include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2-p-phenylenebis(1,3-benzoxazin-4-one) and 2-[2-hydroxy-3-(3,4,5,6-tetrahydrophthalimidomethyl)-5-methylphenyl]benzotriazole. Polymers having a 2-hydroxyphenyl-2H-benzotriazole skeleton such as a copolymer of 2-(2'-hydroxy-5-methaeryloxyethylphenyl)-2H-benzotriazole and a vinyl-based monomer copolymerizable with that monomer and a copolymer of 2-(2'-hydroxy-5-acryloxyethylpheny)-2H-benzotriazole and a vinyl-based monomer copolymerizable with that monomer are also included.

Examples of the ultraviolet absorbent as hydroxyphenyitriazine-based ultraviolet absorbents include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol and 2-(4,6-diphenyl-1,3,5-triazin-2-yl)-5-butyloxyphenol. Further, compounds having a 2,4-dimethylphenyl group in place of the phenyl groups of the above compounds, such as 2-(4,6-bis(2,4-dimethylphenyl)-1,3,5-triazin-2-yl)-5-hexyloxyphenol, are further included.

Examples of the ultraviolet absorbent as cyclic iminoester-based ultraviolet absorbents include 2,2'-p-phenylenebis(3,1-benzoxazin-4-one), 2,2'-m-phenylenebis(3,1-benzoxazin-4-one) and 2,2'-p,p'-diphenylenebis(3,1-benzoxazin-4-one).

Examples of the ultraviolet absorbent as cyanoacrylate-based ultraviolet absorbents include 1,3-bis[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

Moreover, as a result of adopting the structure of a monomer compound capable of radical polymerization, the aforementioned ultraviolet absorber may be a polymeric ultraviolet absorber obtained by copolymerizing an ultraviolet absorbing monomer and/or light stabilizing monomer with a monomer such as an alkyl (meth)acrylate. Preferable examples of the aforementioned ultraviolet absorbing monomer include compounds containing a benzotriazole backbone, benzophenone backbone, triazine backbone, cyclic iminoester backbone or cyanoacrylate backbone in the ester substituent of (meth)acrylic acid ester. Out of these, benzotriazole-based and hydroxyphenyltriazine-based compounds are preferred from the viewpoint of ultraviolet absorbing ability, and cyclic imionoester-based and cyanoacrylate-based compounds are preferred from the viewpoints of heat resistance and hue. Examples of the above ultraviolet absorbent include the KEMISORB 79 of Chemipro Kasei Kaisha, Co., Ltd. and the Tinuvin 234 of BASF Japan Co., Ltd. The above ultraviolet absorbents may be used alone or in combination of two or more.

The content of the ultraviolet absorbent is preferably 0.01 to 3 parts by weight, more preferably 0.01 to 1 part by weight, much more preferably 0.05 to 1 part by weight, particularly preferably 0.05 to 0.5 part by weight based on 100 parts by weight of the resin component composed of component A and component B.

(IX) Antistatic Agent

Since there is a case where antistatic performance is required for the reinforced polycarbonate resin composition of the present invention, the resin composition preferably comprises an antistatic agent in this case. Examples of the antistatic agent include (1) phosphonium salts of an organic sulfonic acid such as phosphonium salts of an arylsulfonic acid typified by phosphonium salts of dodecylbenzenesulfonic acid and phosphonium salts of an alkylsulfonic acid, and phosphonium salts of boric acid such as phosphonium salts of tetrafluoroboric acid. The content of the phosphonium salt is suitably not more than 5 parts by weight, preferably 0.05 to 5 parts by weight, more preferably 1 to 3.5 parts by weight, much more preferably 1.5 to 3 parts by weight based on 100 parts by weight of the resin component composed of component A and component B.

Other examples of the antistatic agent include (2) alkali (earth) metal salts of an organic sulfonic acid such as organic lithium sulfonates, organic sodium sulfonates, organic potassium sulfonates, organic cesium sulfonates, organic rubidium sulfonates, organic calcium sulfonates, organic magnesium sulfonates and organic barium sulfonates. The metal salts are also used as flame retardants as described above. Specific examples of the metal salts include metal salts of dodecylbenzenesulfonic acid and metal salts of perfluoroalkanesulfonic acid. The content of the alkali (earth) metal salt of an organic sulfonic acid is suitably not more than 0.5 part by weight, preferably 0.001 to 0.3 part by weight, more preferably 0.005 to 0.2 part by weight based on 100 parts by weight of the resin component composed of component A and component B. Alkali metal salts such as potassium, cesium and rubidium are particularly preferred.

Still other examples of the antistatic agent include (3) ammonium salts of an organic sulfonic acid such as ammonium salts of an alkylsulfonic acid and ammonium salts of an arylsulfonic acid. The content of the ammonium salt is suitably not more than 0.05 part by weight based on 100 parts by weight of the resin component composed of component A and component B. Further examples of the antistatic agent include (4) polymers containing a poly(oxyalkylene)glycol component such as polyether ester amide as a constituent component. The content of the polymer is suitably not more than 5 parts by weight based on 100 parts by weight of the resin component composed of component A and component B.

(X) Fillers

The reinforced polycarbonate resin composition of the present invention can incorporate various types of fillers as reinforcing filler other than the fibrous filler. Various types of sheet-like fillers and particulate fillers can be used for this filler. Here, sheet-like filler refers to filler that is in the form of a sheet (including those having an irregular surface and those having a curved sheet). Particulate fillers refer to fillers of another shape, including irregular shapes.

Preferred examples of the lamellar filler include glass flakes, talc, mica, kaolin, metal flakes, carbon flakes, graphite and lamellar fillers obtained by coating these lamellar fillers with a different material such as a metal or metal oxide.

The particle diameter of the lamellar filler is preferably in the range of 0.1 to 300 μm. The particle diameter is the median size (D50) of a particle size distribution measured by an X-ray transmission method which is one of liquid-phase sedimentation methods in an area up to 10 μm, the median size (D50) of a particle size distribution measured by a laser diffraction/scattering method in an area of 10 to 50 μm, and a value measured by a vibration sieving method in an area of 50 to 300 μm. The particle diameter is a particle diameter in the resin composition.

The lamellar filler may be surface treated with a silane-based, titanate-based, aluminate-based or zirconate-based coupling agent, sized with a resin such as an olefin-based resin, styrene-based resin, acrylic resin, polyester-based resin, epoxy-based resin or urethane-based resin, or a higher fatty acid ester, or granulated by compression.

(XI) Another Resin and Elastomer

The resin composition of the present invention may comprise small amounts of another resin and an elastomer in place of part of the polycarbonate resin as long as the effect of the present invention is obtained. The total amount of the other resin and the elastomer is preferably not more than 20 wt %, more preferably not more than 10 wt %, much more preferably not more than 5 wt %, most preferably not more than 3 wt % based on 100 wt % of the component composed of component A and component B.

Examples of the other resin include polyester resins such as polyethylene terephthalate and polybutylene terephthalate, polyamide resins, polyimide resins, polyether-imide resins, polyurethane resins, silicone resins, polyphenylene ether resins, polyphenylene sulfide resins, polysulfone resins, polymethacrylate resins, phenol resins and epoxy resins.

Examples of the elastomer include isobutylene/isoprene rubber, styrene/butadiene rubber, ethylene/propylene rubber, acrylic elastomers, polyester-based elastomers, polyamide-based elastomers, MBS (methyl methacrylate/styrene/butadiene) rubber which is a core-shell type elastomer, MB(methyl methacrylate/butadiene) rubber and MAS (methyl methacrylate/acrylonitrile/styrene) rubber.

(XII) Other Additives

The reinforced polycarbonate resin composition of the present invention may comprise a flowability modifier, antibacterial agent, dispersant such as liquid paraffin, photocatalyst-based antifouling agent and photochromic agent.

<Production of Resin Composition>

The reinforced polycarbonate resin composition of the present invention may be melt kneaded by means of an extruder such as a single-screw extruder or double-screw extruder to be pelletized. To produce such a pellet, the above flame retardant, reinforcing filler and additives may be blended. Various products can be manufactured by injection molding the pellet which has been produced from the reinforced polycarbonate resin composition of the present invention as described above.

The resin which has been melt kneaded by means of an extruder may be directly formed into a sheet, film, profile extrusion molded article, direct blow molded article or injection molded article without being pelletized.

During this injection molding, molded articles can be suitably obtained using injection molding methods such as injection compression molding, injection press molding, gas assist injection molding, foam molding (including that carried out by injecting a supercritical fluid), insert molding, in-mold coating molding, molding using an insulated mold, molding using a rapid heating and cooling mold, two-color molding, sandwich molding and ultra-high-speed injection molding in addition to ordinary molding methods according to the objective. The advantages of each of these molding methods are widely known.

In addition, molding using a cold runner system or hot runner system can also be selected. The resin composition of the present invention may be formed into a profile extrusion molded article, sheet or film by extrusion molding. Inflation, calendering and casting techniques may also be used to mold a sheet or film. Further, specific stretching operation may be used to mold a heat shrinkable tube. The resin composition of the present invention can be formed into a molded article by rotational molding or blow molding as well.

<Production of Molded Article>

A molded article can be generally obtained by injection molding the pellet of the reinforced polycarbonate resin composition of the present invention. A molded article can also be manufactured by not only an ordinary cold runner injection molding technique but also a hot runner injection molding technique which enables the elimination of a runner. For injection molding, not only ordinary molding techniques but also molding techniques such as gas assist injection molding, injection compression molding, super high-speed injection molding, injection press molding, two-color molding, sandwich molding, in-mold coating molding, insert molding, foam molding (including what makes use of a super-critical fluid), quick heating and cooling molding, insulated runner molding, in-mold re-melting molding and a combination thereof may be employed.

The notched Charpy impact strength of the molded article of the present invention is preferably 10 kJ/m² or more, more preferably 13 kJ/m² or more and even more preferably 15 kJ/m² or more. Notched Charpy impact strength is determined by measuring a test piece (dimensions: length 80 mm×width 10 mm×thickness 4 mm) in compliance with ISO179 (measurement condition: 23° C.).

The deflection temperature under load of the molded article of the present invention is preferably 140° C. or higher, more preferably 144° C. or higher and even more preferably 145° C. or higher. Deflection temperature under load is determined by measuring a test piece (dimensions: length 80 mm×width 10 mm×thickness 4 mm) in compliance with ISO75-1,2 at a load of 1.80 MPa.

The flexural modulus of the molded article of the present invention is preferably 3500 MPa or more, more preferably 3700 MPa or more and even more preferably 3800 MPa or more. Flexural modulus is determined by measuring a test piece (dimensions: length 80 mm×width 10 mm× thickness 4 mm) in compliance with ISO178.

The molded article of the present invention preferably demonstrates a flame retardant grade of V-0 or V-1 based on UL standard 94 at a thickness of 3.0 mm.

EXAMPLES

The mode of the invention that the inventors of the present invention think is the best is a combination of the preferred ranges of the above requirements. For example, typical examples thereof are described in the following examples. It is to be understood that the present invention is not limited thereto.

1. Evaluation of Fluororesin 1-1. Melting Point

Melting point was determined as the temperature corresponding to the maximum value on a heat of fusion curve when the temperature was raised at the rate of 10° C./min using a differential scanning calorimeter (DSC).

1-2. 5% Weight Loss Temperature

5% weight loss temperature was measured under measurement conditions consisting of a temperature range of 23° C. to 900° C. and heating rate of 20° C./min in a nitrogen gas atmosphere using a thermogravimetric analyzer (TGA) in compliance with JIS K7120. The temperature at which weight loss behavior was observed to exhibit weight loss of 5% was taken to be the 5% weight loss temperature.

2. Evaluation of Glass-Reinforced Polycarbonate Resin Composition 2-1. Impact Resistance (Charpy Impact Strength)

Pellets obtained from each composition of the examples were dried for 5 hours under conditions of 120° C. followed by molding into test pieces (dimensions: length 80 mm×width 10 mm×thickness 4 mm) at a cylinder temperature of 300° C. and mold temperature of 80° C. with an injection molding machine (SG-150U, Sumitomo Heavy Industries, Ltd.). Notched Charpy impact strength was determined by measuring in compliance with ISO179 (measurement temperature 23° C.). Notched Charpy impact strength is preferably greater than 10 kJ/m².

2-2. Heat Resistance (Deflection Temperature Under Load)

Deflection temperature under load (load: 1.80 MPa) was determined by measuring test pieces molded under the same conditions as the aforementioned section 2-1 (dimensions: length 80 mm×width 10 mm×thickness 4 mm) in compliance with ISO75-1,2. Deflection temperature under load is preferably higher than 140° C.

2-3. Strength (Flexural Modulus)

Flexural modulus was determined by measuring test pieces molded under the same conditions as the aforementioned section 2-1 (dimensions: length 80 mm×width 10 mm×thickness 4 mm) in compliance with ISO178. Flexural modulus is preferably higher than 3,500 MPa.

2-4. Heat Stability (Appearance after Retention)

Pellets obtained from each composition of the examples were dried for 5 hours under conditions of 120° C. followed by molding into test pieces (dimensions: length 150 mm×width 150 mm×thickness 2 mm) at a cylinder temperature of 300° C. and mold temperature of 80° C. with an injection molding machine (SG-150U, Sumitomo Heavy Industries, Ltd.). Subsequently, the injection cylinder was retracted following completion of weighing, and after retaining the molten resin in the cylinder for 10 minutes, molding was carried out under the same conditions. Heat stability was evaluated according to the following criteria by visually observing the appearance of three shots of molded articles following retention in the cylinder.

Good: Silver streaks not observed
Poor: Silver streaks observed 2-5. Flame Retardation Flame retardation was evaluated based on UL Rank 94 at a thickness of 3.0 mm in compliance with the method defined by the U.S. Underwriters Laboratories (UL94). Furthermore, the test pieces were molded at a cylinder temperature of 280° C. and mold temperature of 80° C. with an injection molding machine (SG-150U, Sumitomo Heavy Industries, Ltd.). Furthermore, "NotV" was indicated in the case evaluation was unable to satisfy any of the standards of V-0, V-1 or V-2. It is important that dripping not occur during the combustion test and the test piece is preferably evaluated as V-1 or V-0 based on UL Rank 94.

Examples 1 to 34 and Comparative Examples 1-15

Amounts shown in Table 1 to 4 of the components A to C and additives were mixed together by means of a blender and melt kneaded together by means of a vented double-screw extruder to obtain a pellet. After a premixture of the polycarbonate resin and the additives whose amounts were 10 to 100 times larger than the above amounts was prepared, the whole premixture was mixed by means of the blender. The TEX30αvented double-screw extruder of The Nippon Steel Works, Ltd. (completely interlocking type, unidirectional rotation, two screws) was used. The extrusion conditions include a delivery rate of 20 kg/h, a screw revolution of 150 rpm, a vent vacuum degree of 3 kPa, an extrusion temperature from the first feed port to the second feed port of 270° C. and an extrusion temperature from the second feed port to the die of 280° C. The results of the above evaluations are shown in Table 1.

TABLE 1

| | | | | Examples | | | | | | | | |
|---|---|---|---|---|---|---|---|---|---|---|---|---|
| | | | | 1 | 2 | 3 | 4 | 5 | 6 | 7 | 8 | 9 |
| Composition | Comp. A | A-1 | Parts by weight | 90 | | 90 | 90 | 55 | 55 | 55 | 90 | 90 |
| | | A-2 | | | 90 | | | | | | | |
| | Comp. B | B-1 | | 10 | 10 | 10 | 10 | 45 | 45 | 45 | 10 | 10 |
| | | B-2 | | | | | | | | | | |
| | | B-3 | | | | | | | | | | |
| | | B-4 | | | | | | | | | | |
| | Comp. A + Comp. B | | | 100 | 100 | 100 | 100 | 100 | 100 | 100 | 100 | 100 |
| | Comp. C | C-I-1 | | 3 | 3 | 10 | 40 | 3 | 10 | 40 | | |
| | | C-I-2 | | | | | | | | | 3 | 10 |
| | | C-I-3 (compare) | | | | | | | | | | |
| | | C-I-4 (compare) | | | | | | | | | | |
| | | C-I-5 (compare) | | | | | | | | | | |
| | Other components | TMP | | 0.1 | 0.1 | 0.1 | 0.1 | 0.1 | 0.1 | 0.1 | 0.1 | 0.1 |
| | | TN | | | | | | | | | | |
| | | f-114 | | | | | | | | | | |
| | | UV | | | | | | | | | | |
| | | DC | | | | | | | | | | |
| Properties | Impact resistance | Charpy impact strength | kJ/m² | 15 | 14 | 17 | 16 | 13 | 14 | 14 | 15 | 16 |
| | Heat resistance | Deflection temp under load | ° C. | 144 | 144 | 145 | 145 | 148 | 149 | 149 | 144 | 145 |
| | Strength | Flexural modulus | MPa | 3,700 | 3,700 | 3,800 | 3,700 | 7,800 | 8,000 | 7,800 | 3,700 | 3,800 |
| | Flame retardation | UL94, 3.0 mm | — | V-1 | V-1 | V-1 | V-0 | V-1 | V-1 | V-1 | V-1 | V-1 |

| | | | | Examples | | | | | | | |
|---|---|---|---|---|---|---|---|---|---|---|---|
| | | | | 10 | 11 | 12 | 13 | 14 | 15 | 16 | 17 |
| Composition | Comp. A | A-1 | Parts by weight | 90 | 90 | 90 | 90 | 90 | 90 | 80 | 80 |
| | | A-2 | | | | | | | | | |
| | Comp. B | B-1 | | 10 | | | | | 5 | 20 | 20 |
| | | B-2 | | | 10 | 10 | 10 | | | | |
| | | B-3 | | | | | | 5 | | | |
| | | B-4 | | | | | | | 10 | | |
| | Comp. A + Comp. B | | | 100 | 100 | 100 | 100 | 100 | 100 | 100 | 100 |
| | Comp. C | C-I-1 | | | 3 | 10 | 25 | 10 | 10 | 10 | 10 |
| | | C-I-2 | | 40 | | | | | | | |
| | | C-I-3 (compare) | | | | | | | | | |
| | | C-I-4 (compare) | | | | | | | | | |
| | | C-I-5 (compare) | | | | | | | | | |

TABLE 1-continued

| | | | | | | | | | | | |
|---|---|---|---|---|---|---|---|---|---|---|---|
| | Other components | TMP | | 0.1 | 0.1 | 0.1 | 0.1 | 0.1 | 0.1 | 0.1 | 0.1 |
| | | TN | | | | | | | | 10.0 | |
| | | f-114 | | | | | | | | | 0.1 |
| | | UV | | | | | | | | 0.3 | 0.3 |
| | | DC | | | | | | | | | |
| Properties | Impact resistance | Charpy impact strength | kJ/m² | 16 | 13 | 14 | 13 | 12 | 16 | 14 | 15 |
| | Heat resistance | Deflection temp under load | °C. | 145 | 146 | 147 | 147 | 144 | 145 | 150 | 147 |
| | Strength | Flexural modulus | MPa | 3,700 | 7,600 | 7,700 | 7,600 | 3,500 | 3,600 | 4,700 | 4,600 |
| | Flame retardation | UL94, 3.0 mm | — | V-0 | V-1 | V-1 | V-0 | V-1 | V-1 | V-0 | V-0 |

TABLE 2

| | | | | Comparative Examples | | | | | | |
|---|---|---|---|---|---|---|---|---|---|---|
| | | | | 1 | 2 | 3 | 4 | 5 | 6 | 7 |
| Composition | Comp. A | A-1 | Parts by Weight | 90 | 90 | 100 | 45 | 90 | 90 | 90 |
| | | A-2 | | | | | | | | |
| | Comp. B | B-1 | | 10 | 10 | 0 | 55 | 10 | 10 | 10 |
| | | B-2 | | | | | | | | |
| | | B-3 | | | | | | | | |
| | | B-4 | | | | | | | | |
| | Comp. A + Comp. B | | | 100 | 100 | 100 | 100 | 100 | 100 | 100 |
| | Comp. C | C-I-1 | | 1 | 50 | 10 | 10 | | | |
| | | C-I-2 | | | | | | | | |
| | | C-I-3 (compare) | | | | | | 10 | | |
| | | C-I-4 (compare) | | | | | | | 10 | |
| | | C-I-5 (compare) | | | | | | | | 10 |
| | Other components | IMP | | 0.1 | 0.1 | 0.1 | 0.1 | 0.1 | 0.1 | 0.1 |
| | | TN | | | | | | | | |
| | | f-114 | | | | | | | | |
| | | UV | | | | | | | | |
| | | DC | | | | | | | | |
| Properties | Impact resistance | Charpy impact strength | kJ/m² | 9 | 7 | 59 | 7 | 20 | 8 | 7 |
| | Heat resistance | Deflection temp, under load | °C. | 143 | 144 | 126 | 147 | 137 | 143 | 143 |
| | Strength | Flexural modulus | MPa | 3,600 | 3,300 | 2,400 | 8,000 | 3,600 | 3,600 | 3,600 |
| | Flame retardation | UL94, 3.0 mm | — | V-1 | V-0 | V-1 | NotV | V-1 | V-1 | V-1 |

TABLE 3

| | | | | Examples | | | | | | | | |
|---|---|---|---|---|---|---|---|---|---|---|---|---|
| | | | | 18 | 19 | 20 | 21 | 22 | 23 | 24 | 25 | 26 |
| Composition | Comp. A | A-1 | Parts by weight | 90 | | 90 | 90 | 55 | 55 | 55 | 90 | 90 |
| | | A-2 | | | 90 | | | | | | | |
| | Comp. B | B-1 | | 10 | 10 | 10 | 10 | 45 | 45 | 45 | 10 | 10 |
| | | B-2 | | | | | | | | | | |
| | | B-3 | | | | | | | | | | |
| | | B-4 | | | | | | | | | | |
| | Comp. A + Comp. B | | | 100 | 100 | 100 | 100 | 100 | 100 | 100 | 100 | 100 |
| | Comp. C | C-II-1 | | 3 | 3 | 10 | 40 | 3 | 10 | 40 | | |
| | | C-II-2 | | | | | | | | | 3 | 10 |
| | | C-II-3 (compare) | | | | | | | | | | |
| | | C-II-4 (compare) | | | | | | | | | | |
| | | C-II-5 (compare) | | | | | | | | | | |
| | | C-II-6 (compare) | | | | | | | | | | |

TABLE 3-continued

|  |  |  |  |  |  |  |  |  |  |  |  |
|---|---|---|---|---|---|---|---|---|---|---|---|
|  | Other components | TMP<br>TN<br>f-114<br>UV<br>DC |  | 0.1 | 0.1 | 0.1 | 0.1 | 0.1 | 0.1 | 0.1 | 0.1 | 0.1 |
| Properties | Impact resistance | Charpy impact strength | kJ/m² | 16 | 15 | 17 | 16 | 13 | 14 | 14 | 15 | 16 |
|  | Heat resistance | Deflection temp, under load | °C. | 146 | 146 | 147 | 147 | 149 | 151 | 151 | 146 | 147 |
|  | Strength | Flexural modulus | MPa | 3,700 | 3,700 | 3,890 | 3,700 | 7,800 | 8,000 | 7,800 | 3,700 | 13,800 |
|  | Heat stability | Appearance after retention |  | Good | Good | Good | Good | Good | Good | Good | Good | Good |
|  | Flame retardation | UL94, 3.0 mm |  | V-1 | V-1 | V-1 | V-0 | V-1 | V-1 | V-1 | V-1 | V-1 |

|  |  |  |  |  | Examples | | | | | | | |
|---|---|---|---|---|---|---|---|---|---|---|---|---|
|  |  |  |  |  | 27 | 28 | 29 | 30 | 31 | 32 | 33 | 34 |
| Composition | Comp. A | A-1<br>A-2 | Parts<br>by | | 90 | 90 | 90 | 90 | 90 | 90 | 80 | 80 |
|  | Comp. B | B-1<br>B-2<br>B-3<br>B-4 | weight | | 10 | 10 | 10 | 10 | 5<br><br>5 |  | 20 | 20 |
|  | Comp. A + Comp. B |  |  |  | 100 | 100 | 100 | 100 | 100 | 100 | 100 | 100 |
|  | Comp. C | C-II-1<br>C-II-2<br>C-II-3 (compare)<br>C-II-4 (compare)<br>C-II-5 (compare)<br>C-II-6 (compare) |  |  | 3<br>40 | 10 | 25 | 10 | 10 | 10 | 10 | 10 |
|  | Other components | TMP<br>TN<br>f-114<br>UV<br>DC |  |  | 0.1 | 0.1 | 0.1 | 0.1 | 0.1 | 0.1 | 0.1<br>10.0<br><br>0.3 | 0.1<br><br>0.1<br>0.3 |
| Properties | Impact resistance | Charpy impact strength | kJ/m² | | 16 | 13 | 14 | 13 | 12 | 16 | 14 | 15 |
|  | Heat resistance | Deflection temp, under load | °C. | | 147 | 148 | 148 | 148 | 146 | 147 | 152 | 149 |
|  | Strength | Flexural modulus | MPa | | 3,700 | 7,600 | 7,700 | 7,600 | 3,500 | 3,600 | 4,700 | 4,600 |
|  | Heat stability | Appearance after retention |  | | Good | Good | Good | Good | Good | Good | Good | Good |
|  | Flame retardation | UL94, 3.0 mm |  | | V-0 | V-1 | V-1 | V-0 | V-1 | V-1 | V-0 | V-0 |

TABLE 4

|  |  |  |  |  | Comparative Examples | | | | | | | |
|---|---|---|---|---|---|---|---|---|---|---|---|---|
|  |  |  |  |  | 8 | 9 | 10 | 11 | 12 | 13 | 14 | 15 |
| Composition | Comp. A | A-1<br>A-2 | Parts<br>by | | 90 | 90 | 100 | 45 | 90 | 90 | 90 | 90 |
|  | Comp. B | B-1<br>B-2<br>B-3<br>B-4 | weight | | 10 | 10 | 0 | 55 | 10 | 10 | 10 | 10 |
|  | Comp. A + Comp. B |  |  |  | 100 | 100 | 100 | 100 | 100 | 100 | 100 | 100 |
|  | Comp. C | C-II-1<br>C-II-2 |  |  | 1 | 50 | 10 | 10 |  |  |  |  |

TABLE 4-continued

| | | | Comparative Examples | | | | | | | |
|---|---|---|---|---|---|---|---|---|---|---|
| | | | 8 | 9 | 10 | 11 | 12 | 13 | 14 | 15 |
| | | C-II-3 (compare) | | | | | 10 | | | |
| | | C-II-4 (compare) | | | | | | 10 | | |
| | | C-II-5 (compare) | | | | | | | 10 | |
| | | C-II-6 (compare) | | | | | | | | 10 |
| | Other components | TMP | 0.1 | 0.1 | 0.1 | 0.1 | 0.1 | 0.1 | 0.1 | 0.1 |
| | | TN | | | | | | | | |
| | | f-114 | | | | | | | | |
| | | UV | | | | | | | | |
| | | DC | | | | | | | | |
| Properties | Impact resistance | Charpy impact strength kJ/m$^2$ | 9 | 7 | 59 | 7 | 20 | 8 | 7 | 16 |
| | Heat resistance | Deflection temp, under load °C. | 144 | 143 | 126 | 147 | 137 | 143 | 143 | 138 |
| | Strength | Flexural modulus MPa | 3,600 | 3,300 | 2,400 | 8,000 | 3,600 | 3,700 | 3,700 | 3,600 |
| | Heat stability | Appearance after retention — | Good | Good | Good | Poor | Good | Good | Good | Poor |
| | Flame retardation | UL94, 3.0 mm — | V-1 | V-0 | V-1 | NotV | V-1 | V-1 | V-1 | V-1 |

The components in use are detailed hereinbelow.

(Component A)

A-1: polycarbonate resin powder having a viscosity average molecular weight of 22,400 obtained by the following production method

[Production Method]

2,340 parts of ion exchange water, 947 parts of a 25% sodium hydroxide aqueous solution and 0.7 part of hydrosulfite were fed to a reactor equipped with a thermometer, a stirrer and a reflux condenser, 710 parts of 2, 2-bis (4-hydroxyphenyl) propane (may be referred to as "bisphenol A" hereinafter) was dissolved under agitation (bisphenol A solution), 2,299 parts of methylene chloride and 112 parts of a 48.5% sodium hydroxide aqueous solution were added to the resulting solution, and 354 parts of phosgene was blown into the reactor at 15 to 25° C. for about 90 minutes to carry out a phosgene reaction.

After the end of the phosgene reaction, 125 parts of a 11% methylene chloride solution of p-tert-butylphenol and 88 parts of a 48.5% sodium hydroxide aqueous solution were added, stirring was suspended, the resulting solution was left to stand for 10 minutes and separated, stirring was resumed to emulsify the solution, and five minutes after that, the obtained emulsion was treated 35 times of pass at a revolution of 1,200 rpm by means of a homomixer (manufactured by PRIMIX Corporation) to obtain highly emulsified dope. This highly emulsified dope was reacted in a polymerization tank (having a stirrer) at a temperature of 35° C. for 3 hours under no agitation to complete polymerization.

After the end of the reaction, an organic phase was separated, diluted with methylene chloride, rinsed, made acidic with hydrochloric acid and rinsed, the obtained product was injected into a kneader filled with hot water when the conductivity of a water phase became almost the same as that of ion exchange water, and methylene chloride was evaporated under agitation to obtain a polycarbonate powder. After dehydration, the powder was dried at 120° C. for 12 hours with a hot air circulation drier to obtain a polycarbonate resin powder.

A-2: polycarbonate resin powder having a viscosity average molecular weight of 19,800 obtained by the following production method.

[Production Method]

Polycarbonate resin powder was obtained in the same manner as the production method of A-1 with the exception of changing to 128 parts of methylene chloride solution containing p-tert-butylphenol at a concentration of 11%.

(Component B)

B-1: Chopped glass fiber having a circular cross-section (Nitto Boseki Co., Ltd., CSG 3PE-455 (trade name), fiber diameter: 13 μm, cut length: 3 mm, urethane-based sizing agent)

B-2: Carbon fiber (Toho Tenax Co., Ltd., HT C422, fiber diameter: 7 μm)

B-3: Milled glass fiber (Nitto Boseki Co., Ltd., PFE-301, average fiber diameter: 9 μm, average fiber length: 30 μm, treated with silane coupling agent)

B-4: Flat cross-section chopped glass fiber (Nitto Boseki Co., Ltd., CSG 3PA-830, fiber major axis: 27 μm, minor axis: 4 μm, cut length: 3 mm, epoxy-based sizing agent)

(Component C)

(Component (C-1)

C-I-1: Ethylene/tetrafluoroethylene copolymer (melting point: 275° C.)

C-I-2: Ethylene/tetrafluoroethylene copolymer (melting point: 231° C.)

C-I-3 (comparative example): Ethylene/tetrafluoroethylene copolymer (melting point: 191° C.)

C-I-4 (comparative example): Ethylene/tetrafluoroethylene copolymer (melting point: 285° C.)

C-I-5 (comparative example): Polytetrafluoroethylene (Daikin Industries, Ltd., Lubron L7 (trade name)) (melting point: 327° C.) (Component C-II)

C-II-1: Tetrafluoroethylene/hexafluoropropylene copolymer (melting point: 253° C., 5% weight loss temperature: 477° C.)

C-II-2: Tetrafluoroethylene/hexafluoropropylene copolymer (melting point: 292° C., 5% weight loss temperature: 495° C.)

C-II-3 (comparative example): Ethylene/tetrafluoroethylene copolymer (melting point: 191° C., 5% weight loss temperature: 461° C.)

C-II-4 (comparative example): Polytetrafluoroethylene (Daikin Industries, Ltd., Lubron L7 (trade name)) (melting point: 327° C., 5% weight loss temperature: 499° C.)

C-II-5 (comparative example): Tetrafluoroethylene/hexafluoropropylene copolymer (melting point: 306° C., 5% weight loss temperature: 496° C.)

C-II-6 (comparative example): Tetrafluoroethylene/hexafluoropropylene copolymer (melting point: 236° C., 5% weight loss temperature: 466° C.)

(Other Components)

TMP: Phosphate-based stabilizer (Daihachi Chemical Industry Co., Ltd., TMP (trade name))

TN: Carbonate oligomer of tetrabromobisphenol A (Teijin Ltd., FireGuard FG8500 (trade name))

f-114: Potassium perfluorobutane sulfonate (DIC Corp., Megafac F-114P (trade name))

UV: Benzotriazole-based ultraviolet absorber (Chemipro Kasei Kaisha Ltd., Chemisoap 79 (trade name))

DC: Copolymer of maleic anhydride and α-olefin (Mitsubishi Chemical Corp., Diacarna DC30M (trade name))

The invention claimed is:

1. A reinforced polycarbonate resin composition containing, with respect to 100 parts by weight of a component comprised of (A) 90 parts by weight to 95 parts by weight of polycarbonate resin (Component A) and (B) 5 parts by weight to 10 parts by weight of fibrous filler (Component B), (C) 25 parts by weight to 45 parts by weight of a fluororesin (Component C-I) or 25 parts by weight to 45 parts by weight of a fluororesin (Component C-II); wherein, (I) the fluororesin (Component C-I) is a copolymer containing polymerization units represented by the following formula (1) and (2), and the melting point of the fluororesin (Component C-I) is 200° C. to 280° C.:

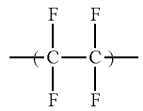

[1]

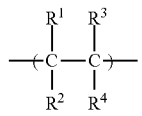

[2]

in the formula (2), $R^1$, $R^2$, $R^3$ and $R^4$ respectively and independently represent a hydrogen atom or alkyl group having 1 to 5 carbon atoms, or (II) the fluororesin (Component C-II) is a copolymer containing polymerization units represented by the formula (1) above, and the following formula (3), the melting point of the fluororesin (Component C-II) is 240° C. to 300° C., and the 5% weight loss temperature of the fluororesin (Component C-II) as determined by thermogravimetric analysis (TGA) is 470° C. or higher:

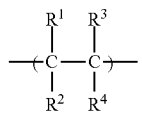

[3]

in the formula (3), $R^1$, $R^2$, $R^3$ and $R^4$ respectively and independently represent a fluorine atom or fluoroalkyl group having 1 to 5 carbon atoms, provided that $R^1$, $R^2$, $R^3$ and $R^4$ are not all fluorine atoms.

2. The reinforced polycarbonate resin composition according to claim 1, wherein $R^1$, $R^2$, $R^3$ and $R^4$ in the formula (2) in the fluororesin (Component C-I) are hydrogen atoms.

3. The reinforced polycarbonate resin composition according to claim 1, wherein the melting point of the fluororesin (Component C-I) is 231° C. to 280° C.

4. A molded article formed of the reinforced polycarbonate resin composition according to claim 1.

5. The reinforced polycarbonate resin composition according to claim 1, wherein Component B is a glass fiber, a carbon fiber or a mixture thereof.

6. The reinforced polycarbonate resin composition according to claim 1, wherein Component B is a glass fiber having a flat cross-section with an average value of a ratio of a major axis to a minor axis (major axis/minor axis) of 2 to 8.

* * * * *